（12） United States Patent
Peterson

(10) Patent No.: US 9,353,928 B2
(45) Date of Patent: May 31, 2016

(54) REFLECTIVE LIGHTING SYSTEM

(71) Applicant: Lifetouch Inc., Eden Prairie, MN (US)

(72) Inventor: Trygve David Peterson, Savage, MN (US)

(73) Assignee: Lifetouch Inc., Eden Prairie, MN (US)

( * ) Notice: Subject to any disclaimer, the term of this patent is extended or adjusted under 35 U.S.C. 154(b) by 103 days.

(21) Appl. No.: 14/465,023

(22) Filed: Aug. 21, 2014

(65) Prior Publication Data

US 2015/0062864 A1    Mar. 5, 2015

Related U.S. Application Data

(60) Provisional application No. 61/871,092, filed on Aug. 28, 2013.

(51) Int. Cl.
  *G03B 15/02*  (2006.01)
  *F21V 7/00*  (2006.01)
  *F21V 8/00*  (2006.01)
(52) U.S. Cl.
  CPC .............. *F21V 7/0008* (2013.01); *G03B 15/02* (2013.01); *G02B 6/0096* (2013.01)

(58) Field of Classification Search
  CPC .... F21V 7/0008; G02B 6/0096; G03B 15/02; G03B 15/03; G03B 15/04; G03B 15/0442; G03B 15/06; G03B 15/07
  USPC ........................................................ 362/3–18
  See application file for complete search history.

(56) References Cited

U.S. PATENT DOCUMENTS

| 5,684,530 A | 11/1997 | White |
| 2008/0055880 A1 | 3/2008 | Williams et al. |
| 2012/0120281 A1 | 5/2012 | Swanson et al. |

FOREIGN PATENT DOCUMENTS

| JP | 10-260461 | 9/1998 |
| JP | 2004-064118 | 2/2004 |

OTHER PUBLICATIONS

PCT International Searching Authority, International Search Report and Written Opinion (PCT/US2014/052119), dated Dec. 11, 2014, 9 pgs.

*Primary Examiner* — Jason Moon Han
(74) *Attorney, Agent, or Firm* — Merchant & Gould P.C.

(57) ABSTRACT

A reflective lighting system for illuminating a subject includes a diffusion panel and a reflector. The diffusion panel is arranged and configured to be illuminated by a light source. The reflector is arranged and configured to receive light from the diffusion panel and redirect the light toward the subject.

20 Claims, 27 Drawing Sheets

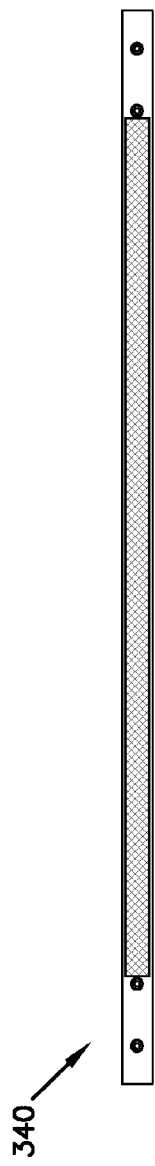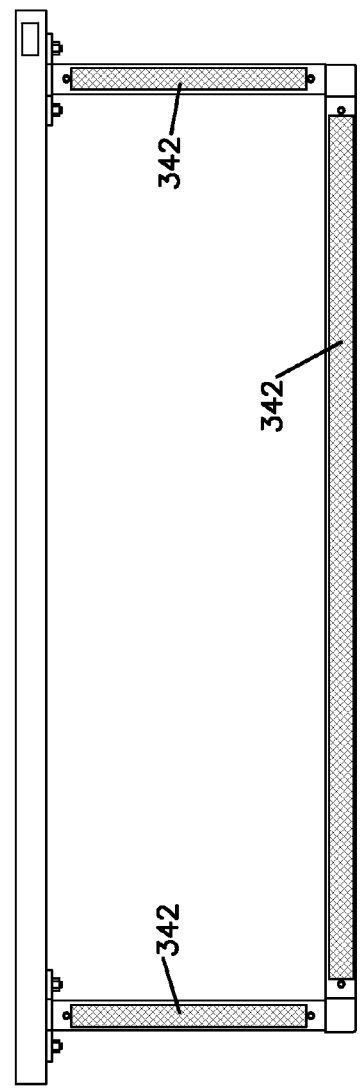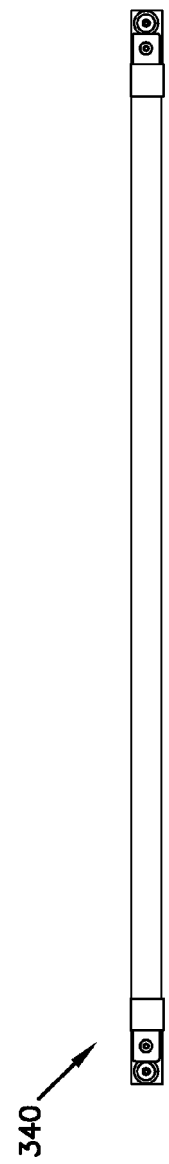

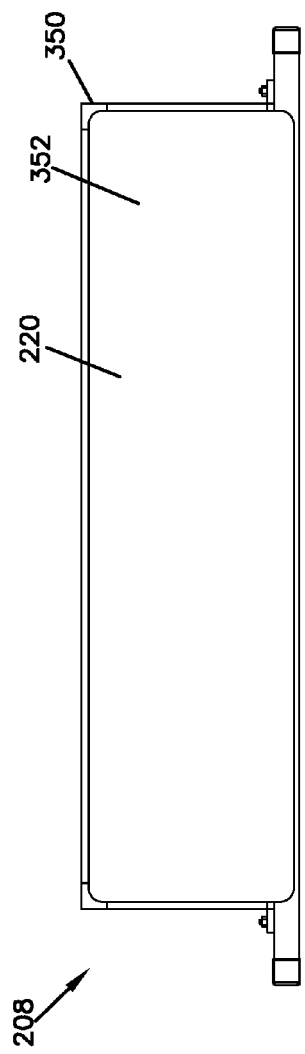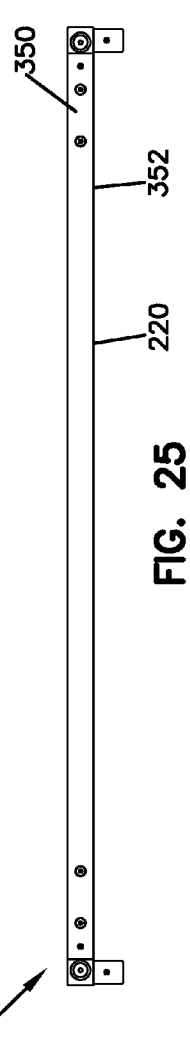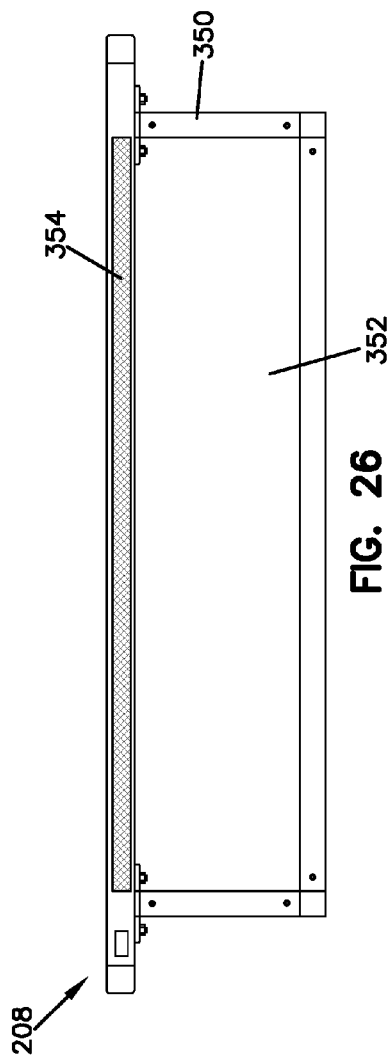

REFLECTIVE LIGHTING SYSTEM

CROSS-REFERENCE TO RELATED APPLICATION

This application claims priority to U.S. Application No. 61/871,092, filed on Aug. 28, 2013, titled REFLECTIVE LIGHTING SYSTEM, the disclosure of which is hereby incorporated by reference in its entirety.

BACKGROUND

A major difference between amateur and professional photography is the quality of the lighting. A professional photographer conducting a portrait photography session may spend hours customizing the lighting for a particular subject. The photographer has numerous tools available to obtain the ideal lighting conditions, including a variety of different light sources, as well as various light modifiers.

In high volume professional photography, the photographer does not have the time to customize the lighting conditions for every subject. Instead, the lighting system of the photography station is configured to accommodate subjects as best as possible, but variations in subject position make it difficult to obtain uniformly complimentary light. Additionally, in portable photography studios, space constraints, such as low ceiling height, limit lighting configuration. As a result, limitations are also imposed on the photographer's subject posing options as well as on the possible positions of the camera.

SUMMARY

In general terms, this disclosure is directed to a photographic lighting system. In one possible configuration and by non-limiting example, the lighting system is a reflective lighting system. Various aspects are described in this disclosure, which include, but are not limited to, the following aspects.

One aspect is a photographic lighting system configured to illuminate a subject space, the photographic lighting system comprising: a diffusion panel configured to receive light from a light source; a light barrier positioned adjacent the diffusion panel to block light from the diffusion panel from the subject space; and a reflector positioned to receive light from the diffusion panel and redirect the light from the diffusion panel toward the subject space.

Another aspect is a reflective lighting system for illuminating a subject space, the reflective lighting system comprising: a light source; a soft box having a reflective interior and first and second opposing ends, the soft box being configured to receive light from the light source at the first end; a diffusion panel arranged across the second end of the soft box; a reflector positioned to receive light from the diffusion panel and reflect the light toward the subject space; and a light barrier positioned between the diffusion panel and the subject space to block light from the diffusion panel from directly illuminating the subject space.

A further aspect is a photography station comprising: a digital camera arranged to capture a photograph of a subject in a subject space; a main lighting system configured to illuminate the subject in the subject space; a photographic background positioned behind the subject space and opposite the digital camera; a hair lighting system, the hair lighting system comprising: a diffusion panel hidden from the digital camera by the photographic background and configured to receive light from a light source; and a reflector positioned above the photographic background and arranged to receive light from the diffusion panel and redirect the light from the diffusion panel toward the subject space.

Another aspect is a method of setting up a reflective lighting system.

BRIEF DESCRIPTION OF THE DRAWINGS

FIG. 21 is a front view of an example frame portion of the soft box shown in FIG. 12.

FIG. 22 is a top view of the example frame portion shown in FIG. 21.

FIG. 23 is a rear view of the example frame portion shown in FIG. 21.

FIG. 24 is a bottom plan view of an example reflector of the reflective lighting system shown in FIG. 12.

FIG. 25 is a front elevational view of the example reflector shown in FIG. 24.

FIG. 26 is a top plan view of the example reflector shown in FIG. 24.

DETAILED DESCRIPTION

Figure 2:
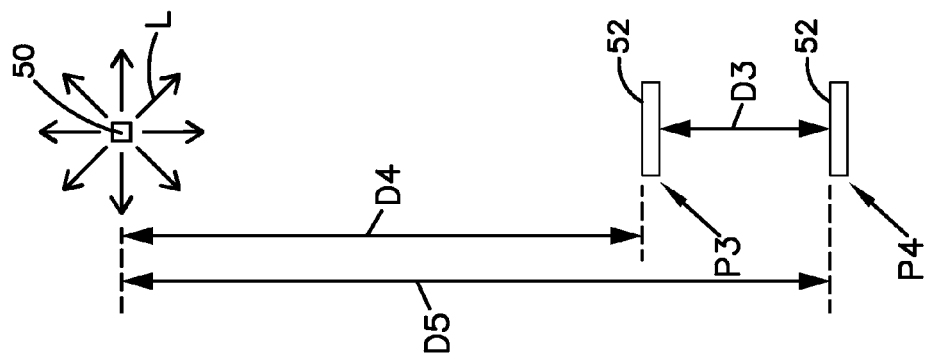
FIG. 2 is a diagram illustrating a technique for reducing the effect of the inverse square law.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Figure 1:
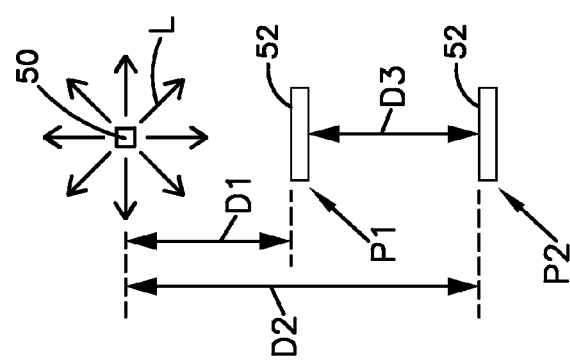
FIG. 1 is a diagram illustrating the inverse square law.

FIGS. 1 and 2 illustrate several introductory principles associated with embodiments of the present disclosure.

FIG. 1 illustrates the inverse square law for the fall off of light from a point light source. FIG. 1 includes a point light source 50 and an object 52. The object 52 is illustrated at a first position P1 and a second position P2.

When light L is emitted from a point light source 50, the light L emanates from the point light source 50 in a spherical pattern in all three dimensions. Some of the light L rays emanate in the direction of the object 52.

When the object 52 is in the first position, it is a distance D1 away from the point light source 50. As one example, the distance D1 is 2 feet. When the object 52 is in the second position P2, it is a distance D2 away from the point light source, where the distance D2 is twice the distance D1. As one example, the distance D2 is 4 feet. The distance between the positions P1 and P2 is distance D3, such as 2 feet.

The inverse square law indicates that the amount of light that reaches an object from a point light source is inversely proportional to the square of the distance. Therefore, in this example, the amount of light that reaches the object 52 at the position P1 is proportional to $1/(P1^2)$, or ¼. Similarly, the amount of light that reaches the object 52 at the position P2 is proportional to $1/(P2^2)$, or ⅟₁₆. Therefore, when the object is twice as far away at the position P2, a quarter of the amount of light reaches it as when it is at the position P1.

In the photography context, this principle means that the position of a subject with respect to the lighting is very important when using a point light source 50. If the lighting is configured for a subject to be placed at the position P1, the light intensity may be too low if the subject is instead at the position P2. Similarly, if the lighting is configured for a subject to be placed at the position P2, the light intensity may be too high if the subject is instead placed at the position P1.

FIG. 2 illustrates a technique for reducing the effect of the inverse square law by moving the point light source further away from the object. FIG. 2 includes the point light source 50 and object 52. In this example, the object 52 is illustrated at a third position P3 and a fourth position P4.

In this example, the distance D3 between positions P3 and P4 is the same as in the example illustrated in FIG. 1, for example, 2 feet. However, in this case the positions P3 and P4 are further away from the point light source 50. Position P3 is a distance D4 away from the point light source 50. In one example, the distance D4 is three times greater than distance D1, or 6 feet. Position P4 is a distance D5 away from the point light source 50. In one example, the distance D5 is two times greater than the distance D2, or 8 feet. However, the distance D3 between the positions P3 and P4 remains the same as in the example shown in FIG. 1, such as 2 feet.

Using the inverse square law it can be seen that the effect of the movement of object 52 between the positions P3 and P4 results in much less variation in the intensity of light. Specifically, the intensity of the light L reaching the object 52 at the position P3 is proportional to $1/(D4^2)$, or ⅟₃₆. The intensity of the light L reaching the object 52 at the position P4 is proportional to $1/(D5^2)$, or ⅟₆₄. Thus 56% of the light reaching object 52 at position P3 will also reach the object 52 at position P4.

Therefore, although the distance D3 between the two positions remains unchanged, the fall off of light is greatly reduced by increasing the distance between the point light source 50 and the positions P3 and P4 of the object 52. In the example of FIG. 1, only 25% of the light reaching the position P1 also reached the position P2. In the example of FIG. 2, 56% of the light reaching the position P3 also reached position P4. Further improvement can be achieved by further increasing the distance between the point light source 50 and the object 52 positions P3 and P4.

Although the arrangement depicted in FIG. 2 does reduce the effect of light fall off from the point light source 50, this arrangement is not feasible in all situations. For example, if the object 52 is within a building and the photographer wants to have the point light source 50 above the object 52, the height of the ceiling within the building may limit the distance that the point light source 50 can be above the object 52. Similarly, if the photographer wants to have the point light source 50 in front of, or to the side of, the object 52, space limitations may limit the distance that the point light source 50 can be away from the object 52 in these directions. Therefore, the arrangement depicted in FIG. 2 is not suitable for all situations.

Figure 3:
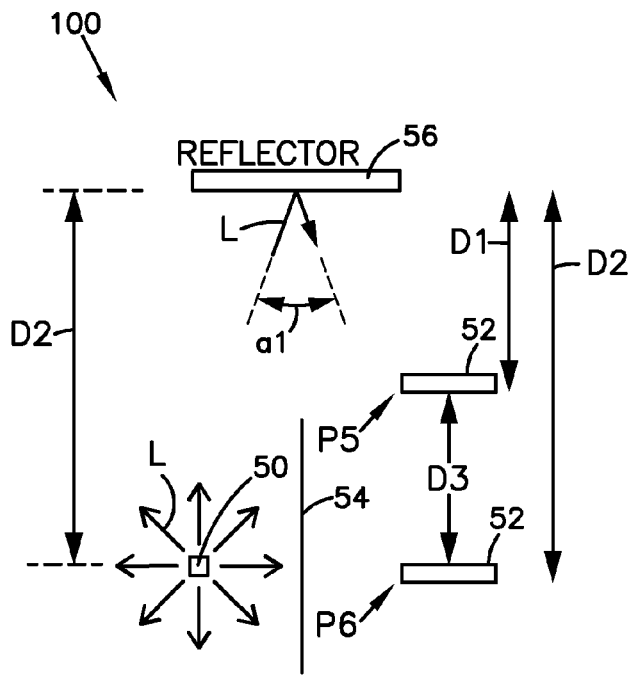
FIG. 3 is a schematic diagram illustrating an example reflective lighting system.

FIG. 3 illustrates an example of a reflective lighting system 100. In this example, the reflective lighting system 100 includes a light source 50, a light barrier 54, and a reflector 56. The reflective lighting system 100 operates to illuminate an object 52. In this example, the object 52 may be positioned at positions P5 and P6.

In this example, the reflective lighting system 100 operates within the same space constraints (D2) as the example shown in FIG. 1, while reducing the fall off of light between positions P5 and P6 as in the example shown in FIG. 2.

In this example, the point light source 50 is positioned adjacent the light barrier 54, which prevents light L emitted from the point light source 50 from directly illuminating object 52 at the positions P5 and P6.

A reflector 56 is positioned a distance D2 away from the point light source 50. The reflector 56 has at least one surface that reflects light. The point light source 50 and the reflector 56 are aligned so that light L from the point light source is reflected by the reflector 56 in the direction of positions P5 and P6.

An angle a1 is defined between the direction of the incoming light L and the direction of the reflected light. The angle a1 is less than 180 degrees. In some embodiments the angle a1 is less than or equal to 135 degrees, less than or equal to 90 degrees, or less than or equal to 45 degrees. In some embodiments the angle a1 is in a range from about 5 degrees to about 90 degrees.

The reflective lighting system 100 is arranged and configured to direct the light L toward the positions P5 and P6. In this example, the position P5 is a distance D1 away from the reflector 56 and the position P6 is a distance D2 away from the reflector 56. Additionally, the positions P5 and P6 are spaced from each other a distance D3, which is the same distance D3 separating the positions in the examples shown in FIGS. 1 and 2.

In this example, even though the reflective lighting system 100 is sized about distance D1, the light L travels much further. Specifically, to illuminate the object 52 at position P5, the light L travels at least the distance D2 to the reflector 56, as well as the distance D1 from the reflector 56 to the object 52, or a distance D2+D1. Using the example dimensions from FIG. 1, the distance D2 (4 feet)+D1 (2 feet) is at least 6 feet. Similarly, to illuminate the object 52 at position P6, the light L travels at least the distance D2 from the light source 50 to the reflector 56, plus the distance D2 from the reflector 56 to the object 52, or 8 feet. Further, the actual distances will be greater depending on the specific angle a1.

Therefore, the example reflective lighting system 100 exhibits a reduction in the effect of the fall off of light similar to that described in the example shown in FIG. 2, without requiring the point light source 50 to be placed so far away. For example, using the exemplary dimensions of the example in FIG. 2, at least 56% of the light L reaching the object 52 at position P5 will also reach the object at position P6, in contrast to the example of FIG. 1 in which only 25% of the light reached the object in both positions P1 and P2. Further improvement can be achieved by further increasing the distance between the point light source 50 and the positions P5 and P6 of object 52, and/or by adjusting the angle a1.

Moreover, this example illustrates an example of a lighting system in which the light output from the reflective lighting system 100 does not exhibit light fall off according to the inverse square law. Rather, the light fall off is much less.

From the perspective of an observer (such as the object 52, a photographer, or a camera involved in photographing the object 52), the reflector 56 of the reflective lighting system 100 is itself the light source, because the light appears to come out of the reflector 56. In other words, to the observer it appears that the light source 50 is actually positioned at the reflector 56 (or, more specifically, it appears that the light source 50 is positioned about the distance D6 above the reflector 56) and operates to emit light toward the object 52. The reflective lighting system 100 can therefore be used to perform the same function as the light source 50 in the example shown in FIG. 2, with a system that requires much less space. In contrast to the example in FIG. 1 (e.g., if the light source 50 were positioned at the location of reflector 56 shown in FIG. 3), the light output from the reflective light source 100 will exhibit much less light fall off between the two object positions. Therefore, the reflective lighting system 100 overcomes the problem of light fall off according to the inverse square law.

Figure 4:
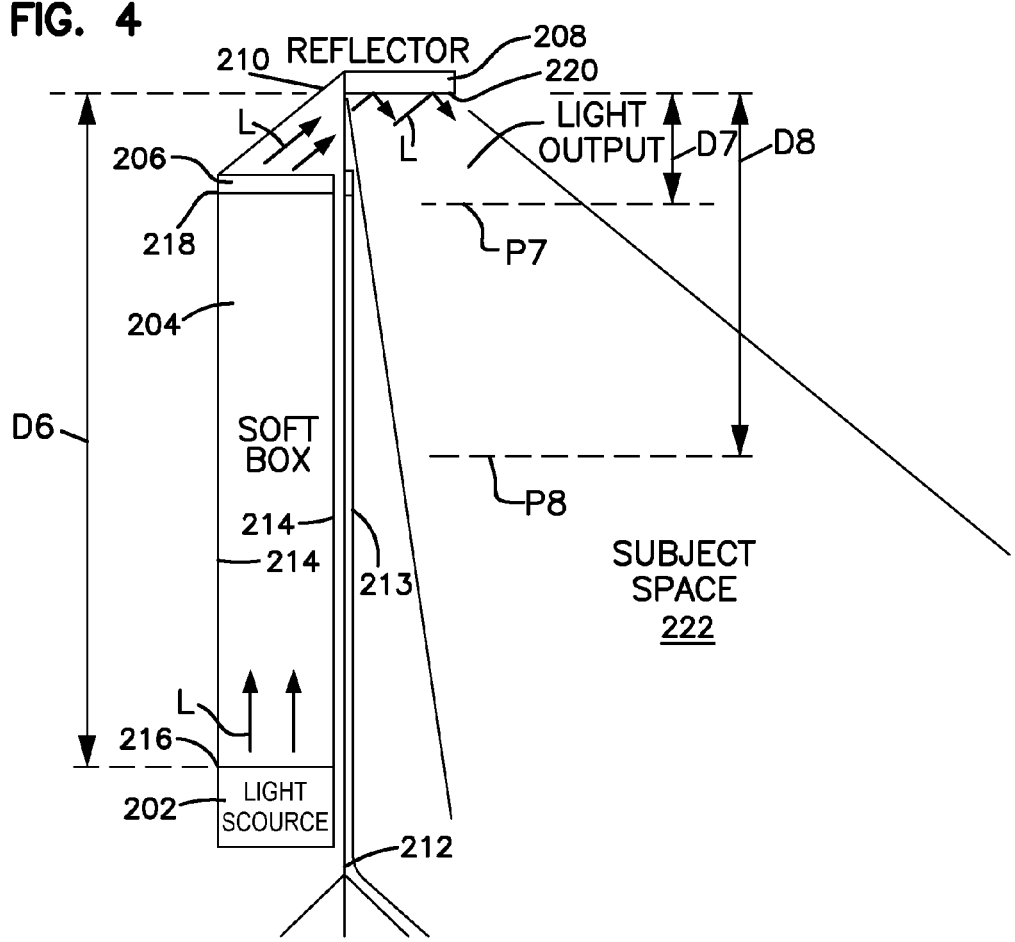
FIG. 4 is a schematic side view of another example reflective lighting system.

FIG. 4 is a schematic side view of another example reflective lighting system 200. The reflective lighting system 200 is an example embodiment which incorporates some of the aspects of the reflective lighting system 100, shown in FIG. 3.

In this example, the reflective lighting system 200 includes a light source 202, a soft box 204, a diffusion panel 206, a reflector 208, a light absorbing material 210, a support structure 212, and a light barrier 213. The reflective lighting system 200 generates a light output that illuminates a subject position.

The light source 202 generates and emits light L. Examples of the light source 202 include one or more of an incandescent bulb, a fluorescent lamp, a light-emitting diode, and a discharge lamp.

The soft box 204 receives light L from the light source 202 at an end 216. The soft box 204 is formed of a structure that includes a reflective internal surface 214 and defines a hollow interior space. Some of the light L passes directly through the hollow space to the end 218, while the rest of the light L is reflected within the hollow interior space by the reflective internal surface 214 until the light L reaches the end 218.

Some embodiments include the diffusion panel 206. The diffusion panel 206 is arranged at the end 218 of the soft box 204, across an opening in the soft box 204. An example of the diffusion panel 206 is a white fabric sheet of material which diffuses the light L. The diffused light passes through the diffusion panel 206.

The reflector 208 receives at least some of the light L that passes through the diffusion panel 206. The reflector 208 includes a reflective surface 220 that reflects the light L out of the reflective lighting system 200 and toward the subject space 222.

Some embodiments include a light absorbing material 210 positioned adjacent the reflector and the diffusion panel 206. The light absorbing material 210 absorbs light L from the diffusion panel 206 that is not directed toward the reflector. The light absorbing material 210 is a black non-reflective material, for example, which absorbs the excess light to prevent the light L from undesirably illuminating surrounding objects within the environment of the reflective lighting system 200.

Some embodiments also include a support structure 212. The support structure 212 typically includes a rigid frame that supports the components of the reflective lighting system 200 in its desired configuration. Although the support structure 212 is illustrated in FIG. 4 as supporting the reflective lighting system 200 in a vertical orientation on a floor, the reflective lighting system 200 can alternatively be arranged in other configurations, such as in a horizontal or angled configuration.

Some embodiments further include a light barrier 213. The light barrier 213 operates to block light from diffusion panel 206, to prevent the light from directly illuminating either the subject or a camera (shown in FIG. 5). In some embodiments the light barrier 213 functions to hide the diffusion panel from the subject space 222 and from the camera. The light barrier 213 is formed of a material that does not transmit light. In one example, the light barrier 213 is a flap or panel that extends from the soft box adjacent the diffusion panel. In another embodiment, the light barrier 213 is a photographic background, as discussed in further detail herein.

When the reflective lighting system 200 is used during photography, the subject is arranged in the subject space 222. Depending on the height of the subject, and whether the subject is seated, standing, kneeling, etc., the top of the subject may be in various positions. For example, the top of the subject's head may be at position P7 for a tall subject that is standing, while a shorter subject or a subject who is seated may be at a position P8.

If a point light source were positioned at the location of reflector 208, the light emitted from the light source would exhibit fall off as defined by the inverse square law, as discussed with reference to the example shown in FIG. 1. The light L output from the reflective lighting system 200, however, exhibits a different fall off of light. As a result, even for relatively large differences between subject positions P7 and P8 (distances D7 and D8, respectively, away from the reflector 208), the fall off of light output from the reflector 208 is less than that defined by the inverse square law for a point light source, such as illustrated in the example shown in FIG. 3, due at least in part to the additional distance D6 that the light travels before reaching the reflector 208, and also due to the diffusion of the light across a large diffusion panel, as discussed below. Additional modification of the fall of off light can also be accomplished as described with reference to FIGS. 7-10.

The magnitude of the fall off of light is further improved over the example shown in FIG. 3 by the use of the soft box 204 and diffusion panel 206. The soft box 204 provides a distance for the light L from the light source to expand before illuminating the diffusion panel 206. This permits the diffusion panel 206 to be quite large. In contrast, if a light source were positioned at the location of the reflector, and a soft box and diffusion panel were used, the size of the soft box would be limited by distance between the light source and the maximum desired position P7 of the subject. In such a case, the expansion space would be very limited, so that the light could not illuminate a large diffusion panel.

Further, because the light output from the soft box 204 and diffusion panel 206 is spread out over a larger space, the light no longer acts as if it came from a point light source 50, as in the examples shown in FIGS. 1-3. Instead, the light is diffused in all directions from across the entire surface of the diffusion panel. This further reduces the effect of light fall off from the reflective lighting system 200.

As can also be seen in FIG. 4, the configuration of the reflective lighting system 200 consumes very little space above the subject space 222, which allows the subject space to be nearly as tall as a ceiling height of a room in which the reflective lighting system 200 is positioned. In this example, the highest point of the reflective lighting system is the top of the support structure 212, such as the top of the reflector 208. The light is output from the reflective lighting system 200 at the reflective surface 220, which is the bottom surface of the reflector 208. Therefore, the minimum space required between the highest point and the light output area (reflective surface 220) is the thickness of the reflector 208. In some embodiments the thickness of the reflector is less than 3 inches, such as in a range from about 0.5 inches to about 3 inches, or about 1 inch. Therefore, if a room has a ceiling of 7 feet tall, the subject space 222 provided by the reflective lighting system 100 can have a height in a range from about 6 feet 9 inches to about 6 feet 11.5 inches.

If the light source 202 were instead arranged at the location of the reflector 208, the minimum space required by the light source 202 would typically be greater than the thickness of the reflector, such as greater than 1 or 3 inches, thereby reducing the available height of the subject space 222 accordingly. Moreover, the quality of light output from the reflective lighting system 200 is further improved by spacing the light source 202 from the reflector by a distance D6, and by diffusing the light with the diffusion panel 206. Additional space would be required if the light source 202 and soft box 204 were all positioned above the subject space 222.

Figure 5:
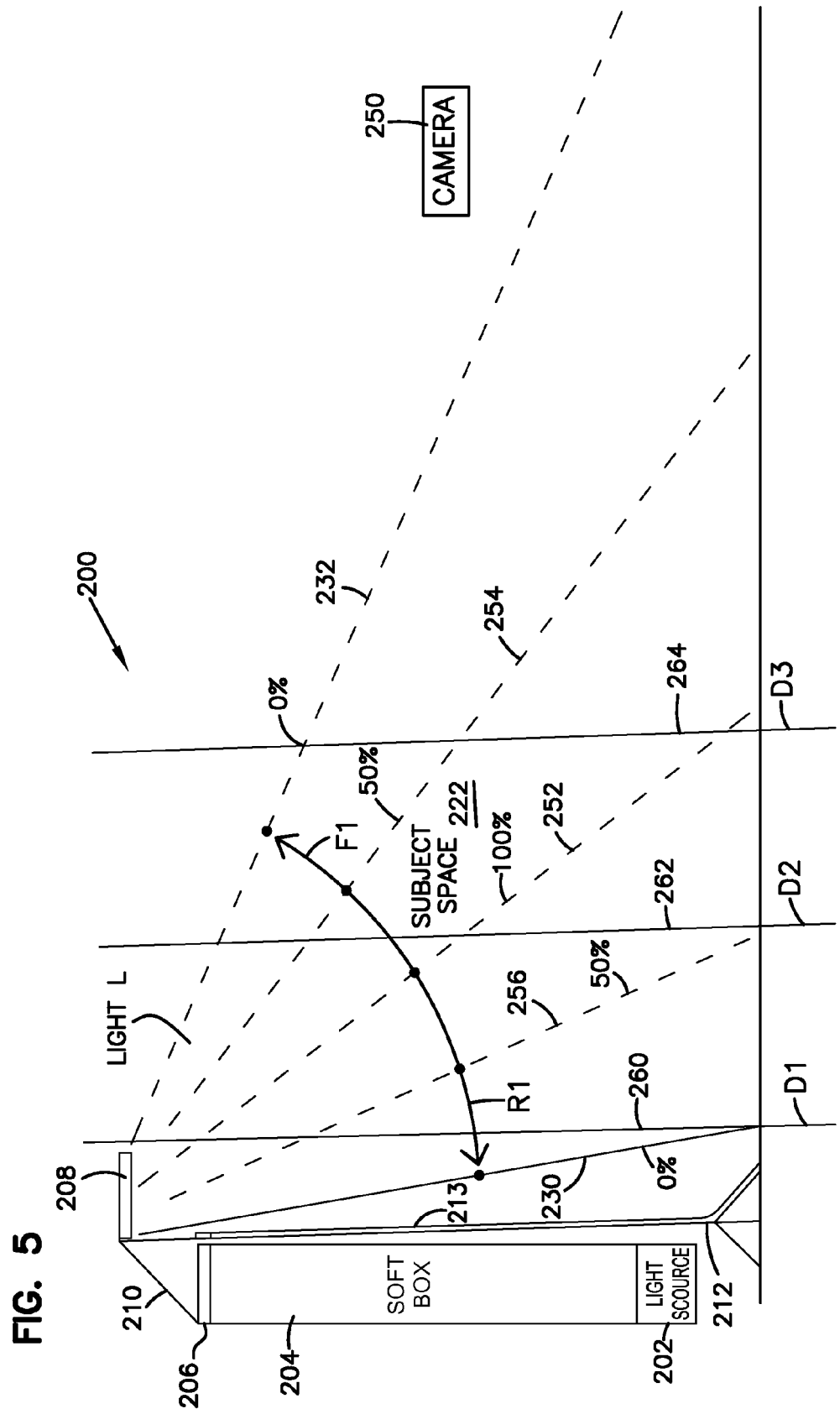
FIG. 5 is a schematic diagram further illustrating the reflective lighting system shown in FIG. 4.
Figure 6:
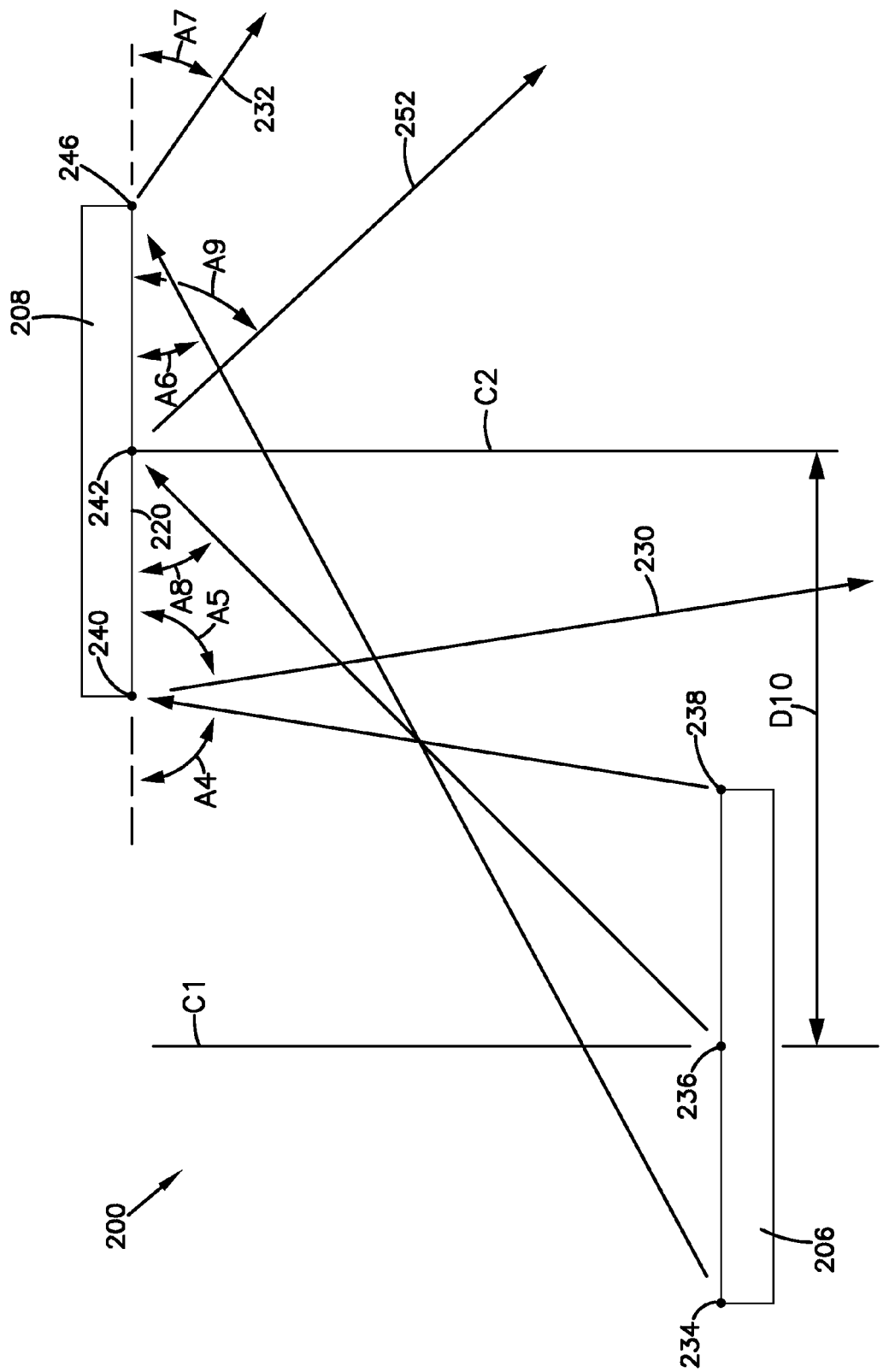
FIG. 6 is a schematic diagram illustrating a portion of the reflective lighting system shown in FIG. 5.

FIGS. 5 and 6 are schematic diagrams illustrating an example of the reflective lighting system 200 shown in FIG. 4. FIG. 5 is a side elevational view. FIG. 6 is also a side elevational view illustrating an enlarged portion of the reflective lighting system shown in FIG. 5.

Referring to FIG. 5, the reflective lighting system 200 includes the light source 202, the soft box 204 with diffusion panel 206, the reflector 208, the light absorbing material 210, the support structure 212, and the light barrier 213. The light (L) emitted from the reflective lighting system 200 is also shown.

The reflective lighting system 200 generates and outputs light L to illuminate a subject space 222, in which the one or more subjects will be positioned during a photography session.

The configuration of the reflective lighting system 200 defines boundaries of the light L. Specifically, FIG. 5 depicts a forward dimension of the light L emitted from the reflective lighting system 200. The forward boundaries include a proximal edge 230 and a distal edge 232.

The proximal edge 230 is defined by the relative positions of the diffusion panel 206 and the reflector 208. Depending on the particular configuration, the proximal edge 230 may also be defined by the upper edge of the light barrier 213 (such as a header bar of a background), such that the proximal edge is defined by the edge of a shadow cast by the light barrier 213. When the surface 220 of the reflector is planar, the angle of incidence is equal to the angle of reflection. Therefore, the proximal edge 230 has an angle A5 of reflection that is equal to the angle of incidence A4 of light originating from the forward edge 238 of the diffusion panel 206 and reflected by the rearward edge 240 of the reflector 208, as shown in FIG. 6.

Figure 12:
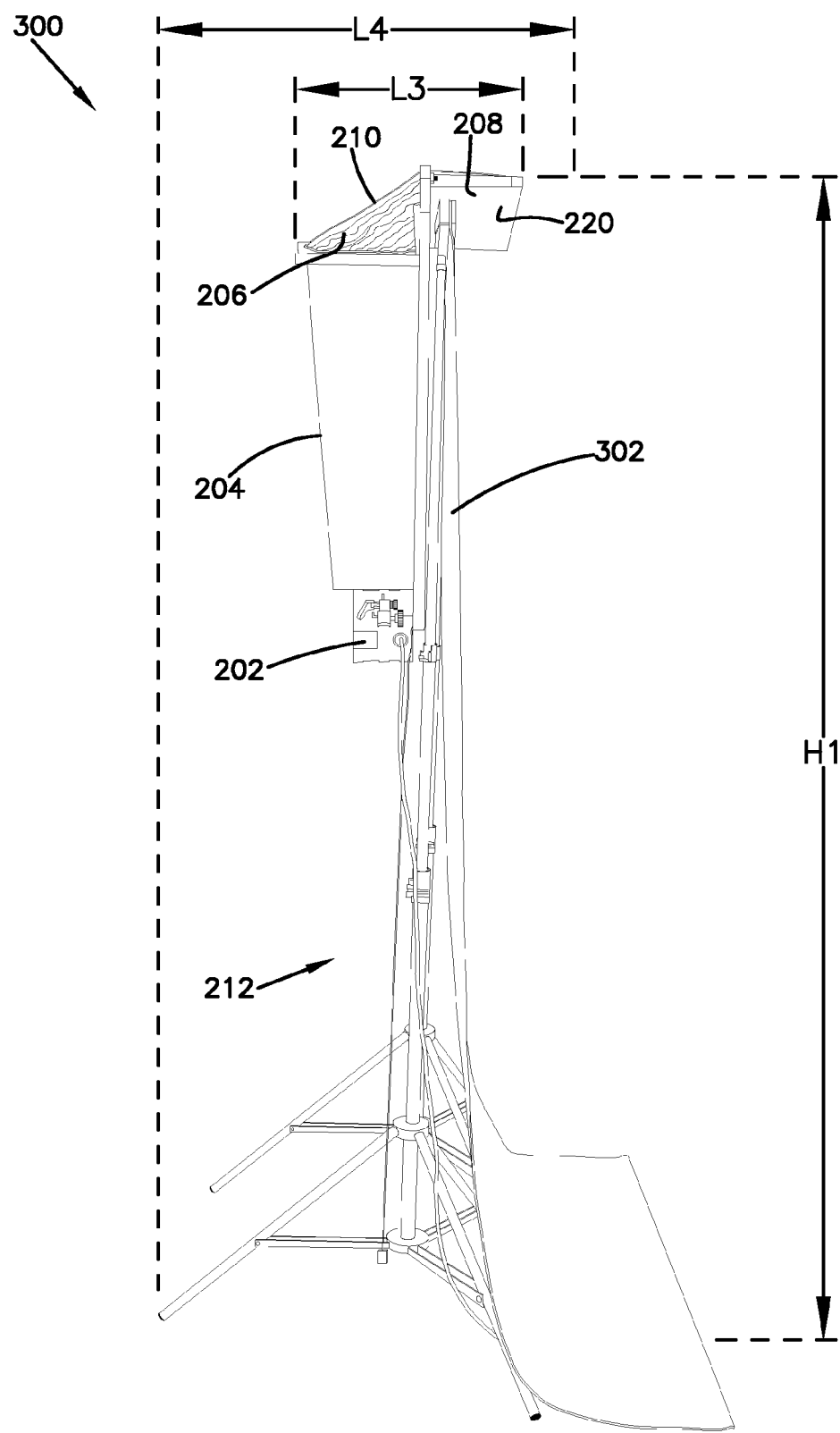
FIG. 12 is a perspective side view of another example of a reflective lighting system.

In some embodiments the proximal edge 230 has an angle A5 that is equal to or less than about 90 degrees. Additionally, in embodiments including a background (such as shown in FIG. 12), the proximal edge 230 can be configured forward of the background to prevent undesired illumination of the background. In another possible embodiment, however, the proximal edge 230 is configured to intentionally illuminate the background, such as to form a background lighting system. This can be accomplished, for example, by rotating the forward edge 246 of the reflector downward so that the angle A5 of the proximal edge 230 is greater than 90 degrees from the horizontal.

The distal edge 232 is also defined by the relative positions of the diffusion panel 206 and the reflector 208. More specifically, the distal edge 232 has an angle A7 of reflection that is equal to the angle of incidence A6 of light originating from the rearward edge 234 of the diffusion panel 206 and reflected by the forward edge 246 of the reflector 208, as shown in FIG. 6.

Referring to FIG. 5, in some embodiments the position of the distal edge 232 is selected to prevent illumination of the camera 250 used in the photography session, which can lead to an undesired flare in the resulting photographs. The appropriate angle A7 (FIG. 6) of the distal edge 232 of the light L can be selected to prevent illumination of the camera 250 when the camera 250 is at or above a minimum height and at or beyond a minimum distance away from the reflective lighting system 200.

Referring briefly to FIG. 6, an embodiment of the reflective lighting system 200 is shown in which the reflector 208 is offset (e.g., horizontally offset) from the diffusion panel 206. For example, the diffusion panel 206 has a central axis C1 normal to the surface of the diffusion panel 206) and the reflector 208 has a central axis C2 normal to the reflective surface 220. In this example, the reflector 208 is offset from the diffusion panel 206 by a distance D10.

FIG. 5 also illustrates another aspect of the reflective lighting system 200. In some embodiments, the reflective lighting system 200 can be arranged and configured to provide a selective amount of light to various locations within the subject space 222. This is sometimes referred to herein as a feathering function of the reflective lighting system 200.

As discussed in more detail below, one example implementation of the feathering function of the reflective lighting system 200 is a lighting system in which the amount of light illuminating a subject that is closer to the reflector 208 can actually be less than the amount of light illuminating a subject that is further away from the reflector 208. This is in sharp contrast to the example lighting systems shown in FIGS. 1-2, in which the intensity of light decreases the further away an object 52 is from the light source 50. Embodiments of the reflective lighting system 200 can be configured so that the intensity of light increases the further away an object is from the reflector 208. Other configurations are also possible to permit the selection of different light intensities at different locations within the subject space 222.

The embodiment shown in FIG. 5 is used to illustrate this aspect. In this example, the reflective lighting system 200 includes a diffusion panel 206 and a reflector 208 which are arranged with facing surfaces that are supported by the support structure 212 so that they are parallel to each other.

In this configuration, the light (L) output from the reflective lighting system 200 is bounded in one dimension by the boundaries including a proximal edge 230 and a distal edge 232, as previously discussed. The light output also has a central axis 252. The central axis 252 has an angle of reflection A9 (shown in FIG. 6) that is equal to the angle of incidence A8 of light originating from the center 236 of the diffusion panel 206 and reflected by the center 242 of the reflector 208.

The reflective lighting system 200 provides maximum light output along the central axis 252. The reason for this is more easily understood with reference to FIG. 7, which depicts the view of a portion of the reflective lighting system 200 by an observer positioned along the central axis 252. As shown in the reflector 208, the entire diffusion panel 206 is visible in the reflection provided by the reflector 208. This indicates that light from across the entire diffusion panel 206 is reflected toward a subject when the subject is positioned along the central axis 252. Referring back to FIG. 5, the annotation "100%" on central axis 252 indicates that 100% of the diffusion panel is used to illuminate a subject when positioned along the central axis 252.

Figures 7, 8:
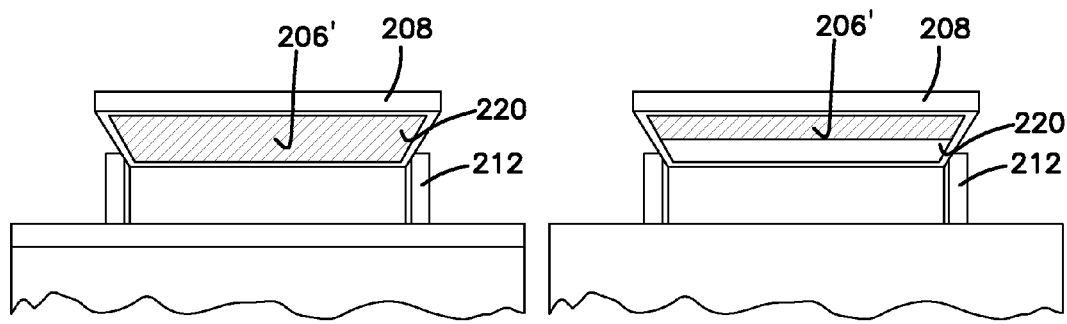
FIG. 7 is a front view of a portion of the reflective lighting system shown in FIG. 5 as viewed from a central axis within a subject space.
FIG. 8 is a front view of the portion of the reflective lighting system shown in FIG. 7 as viewed from another axis within the subject space.

In some embodiments, the reflective lighting system 200 is configured so that the percentage of the diffusion panel 206 that is reflected by the reflector 208 at positions forward (F1) and rearward (R1) rearward of the central axis 252. For example, another axis 254 is positioned midway between the central axis 252 and the distal edge 232. As depicted in FIG. 8, only half of the diffusion panel 206 is visible in the reflection from the reflector 208. This indicates that only half of the diffusion panel 206 is used to illuminate a subject when the subject is positioned along the axis 254. Therefore, the intensity of light along the axis 254 is about one half of the intensity of light along the central axis 252. Referring back to FIG. 5, the annotation "50%" on axis 254 indicates that 50% of the diffusion panel is used to illuminate a subject when positioned along the axis 254.

Figures 9, 10:
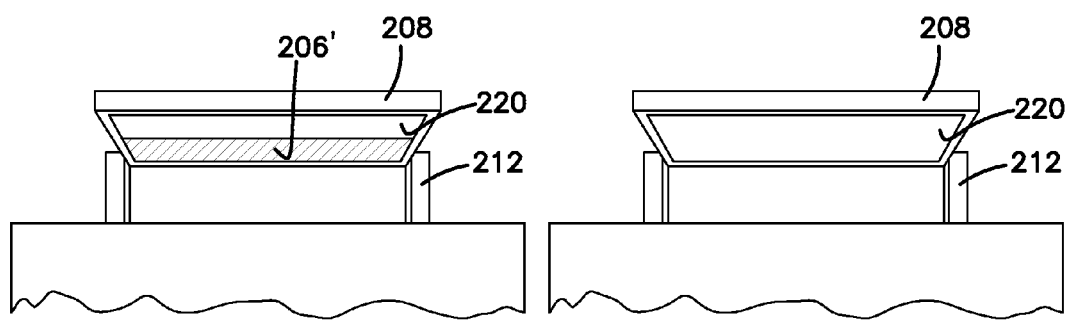
FIG. 9 is a front view of the portion of the reflective lighting system shown in FIG. 7 as viewed from another axis within the subject space.
FIG. 10 is a front view of the portion of the reflective lighting system shown in FIG. 7 as viewed from another axis within the subject space.

Another axis 256 is positioned midway between the proximal edge 230 and the central axis 252. As depicted in FIG. 9, only the other half of the diffusion panel 206 is visible in the reflection from the reflector 208. This indicates that only half of the diffusion panel 206 is used to illuminate a subject when the subject is positioned along the axis 256. Therefore, the intensity of the light along the axis 256 is about one half of the intensity of light along the central axis 252. Referring back to FIG. 5, the annotation "50%" on axis 256 indicates that 50% of the diffusion panel is used to illuminate a subject when positioned along the axis 256.

As previously discussed, the proximal and distal edges 230 and 232 of the light output define boundaries of the light output from the reflective lighting system. Therefore, there is no light from the diffusion panel 206 that is reflected by the reflector 208 to positions forward and above the distal edge 232 nor behind and below the proximal edge 230. For example, FIG. 10 illustrates a portion of the reflective lighting system as viewed from the location of camera 250 (forward and above the distal edge 232). As can be seen, no portion of the diffusion panel 206 is visible in the reflector 208. Referring back to FIG. 5, the annotation "0%" on edges 230 and 232 indicates that 0% of the diffusion panel is used to illuminate a subject when positioned outside of the edges 230 or 232.

The reflective lighting system 200 can be specially configured to beneficially utilize these variations in lighting conditions at different locations within the subject space 222. To illustrate this, three exemplary subject axes 260, 262, and 264 are illustrated in FIG. 5 within the subject space 222. The subject axes 260, 262, and 264 represent three possible locations that a subject could be arranged within the subject space 222 during a photography session. The subject axis 260 is a vertical axis positioned a distance D1 away from the reflective lighting system 200, such as at a location where the proximal edge intersects with a floor. The subject axis 262 is a vertical axis positioned a greater distance D2 away from the reflective lighting system 200. The subject axis 264 is a vertical axis positioned an even greater distance D3 away from the reflective lighting system 200.

The subject axis 260 extends from the proximal edge 230, through axis 256, central axis 252, axis 254, and through the distal edge 232. The percentage of the diffusion panel 206 that is used to illuminate a subject along the subject axis 260 therefore varies from 0% at edge 230 to 100% at axis 252 and back to 0% at edge 232. However, most of subject axis 260 is arranged between the central axis 252 and the proximal edge 230. Within this region, the intensity of light increases with increasing height long the subject axis 260. Therefore, the apparent fall off of light is magnified for subjects positioned along the subject axis 260 and below the central axis 252.

The subject axis 262 extends from about the axis 256, through the central axis 252, the axis 254, and the distal edge 232. The percentage of the diffusion panel 206 that is used to illuminate the subject along the subject axis 262 therefore varies from about 50% near the axis 256 to 100% at the central axis, and down to 0% at the edge 232. In this example, the portion of the subject axis 262 that is within the light output from the reflective lighting system 200 is about equally split above and below the central axis 252. Therefore, the apparent fall off of light is magnified below the central axis 252, but is reduced or even reversed above the central axis 252. No light illuminates a subject positioned above the distal edge 232.

When the lighting system 200 is configured such that the central axis 252 intersects with the subject axis 262 (subject position D2) at about the height of the shortest anticipated subject (such as, for example, 36"), the top of all subjects photographed at that subject position D2 will be at or above the central axis 252. As a result, the fall off of light can be canceled out or even reversed, such that the intensity of light can remain substantially constant or even decrease for taller subjects.

The subject axis 264 extends from about the axis 252, through the axis 254, and through the distal edge 232. Therefore, the percentage of the diffusion panel 206 that is used to illuminate the subject along the subject axis 264 varies from 100% at the central axis 252 to 50% at the axis 254 and to 0% at the distal edge 232. In this example, most or all of the subject axis 264 that is within the light output from the reflective lighting system 200 is positioned between the central axis 252 and the distal edge 232. Therefore, the apparent fall off of light is reduced or even reversed at this subject axis 264, such that the further up the subject axis, the lower the percentage of the diffusion panel 206 that is used to illuminate that position. This results in a reduction or even a reversal of the fall off of light at these positions within the subject space 222, such that less light illuminates a subject that is closer to the reflector 208 (e.g., taller) than a subject that is further from the reflector 208 (e.g., shorter). Therefore, within the region of the subject space 222 between the central axis 252 and the distal edge 232, the reflective lighting system 200 can be arranged and configured to reduce, cancel, or even reverse the fall off of light experienced as a subject moves away from the reflector 208 within this region.

Table 1 provides data collected from a light meter for an experimental implementation of the reflective lighting system 200. A light meter was used to measure the light output at 3" increments along a subject axis positioned about 5 feet forward of the reflective lighting system 200, at approximately the subject location D2 shown in FIG. 5.

TABLE 1

| Height (Inches) | Reading from Power Meter |
| --- | --- |
| 75 | 1.4.3 |
| 72 | 1.4.6 |
| 69 | 2.0.5 |
| 66 | 2.8.1 |
| 63 | 2.8.3 |
| 60 | 2.8.6 |
| 57 | 2.8.9 |
| 54 | 4.0.0 |
| 51 | 4.0.0 |
| 48 | 4.0.0 |
| 45 | 4.0.0 |
| 42 | 4.0.0 |
| 39 | 2.8.9 |
| 36 | 2.8.9 |
| 33 | 2.8.8 |
| 30 | 2.8.7 |

On a power meter, each stop represents twice the power of the lower stop. For example, 4.0=2×2.8=4×2.0=8×1.4. The last significant digit represents 1/10th stop increments. For example, 4.0.0=2.8.9+1/10th=2.8.8+2/10ths. Additionally, it is noted that the smallest difference detectable by human eyes is about 2/10ths to 3/10ths of a stop.

Several points can be observed from the experimental data shown in Table 1. The highest value in Table 1 (4.0.0) is 2.7 stops brighter than the lowest value 1.4.3. In the bottom of the scale (from 60" down to 30") the power of the light is essentially the same (2.8.8±0.2). The upper measurements (from 63" up to 75") exhibit diminishing power with increased height.

Therefore it can be seen that the experimental implementation of the reflective lighting system 200 exhibits a reversal in the fall off of light for heights greater than 54, such that the light intensity increases as height decreases. FIGS. 7-10 illustrate a portion of the reflective lighting system 200 as viewed from various positions within the subject space 222 shown in FIG. 5. FIG. 7 illustrates a view from along the central axis 252, shown in FIG. 5. FIG. 8 illustrates a view from along the axis 254, shown in FIG. 5. FIG. 9 illustrates a view from along the axis 256, shown in FIG. 5. FIG. 10 illustrates a view from outside of edges 230 or 232, such as at the illustrated position of camera 250, shown in FIG. 5.

The portion of the reflective lighting system 200 includes the reflector 208 having a reflective surface 220, and a support structure 212. A reflection 206' of the diffusion panel 206 is also visible in FIGS. 7-9. FIGS. 7-10 are discussed in more detail with reference to FIG. 5 above.

Figure 11:
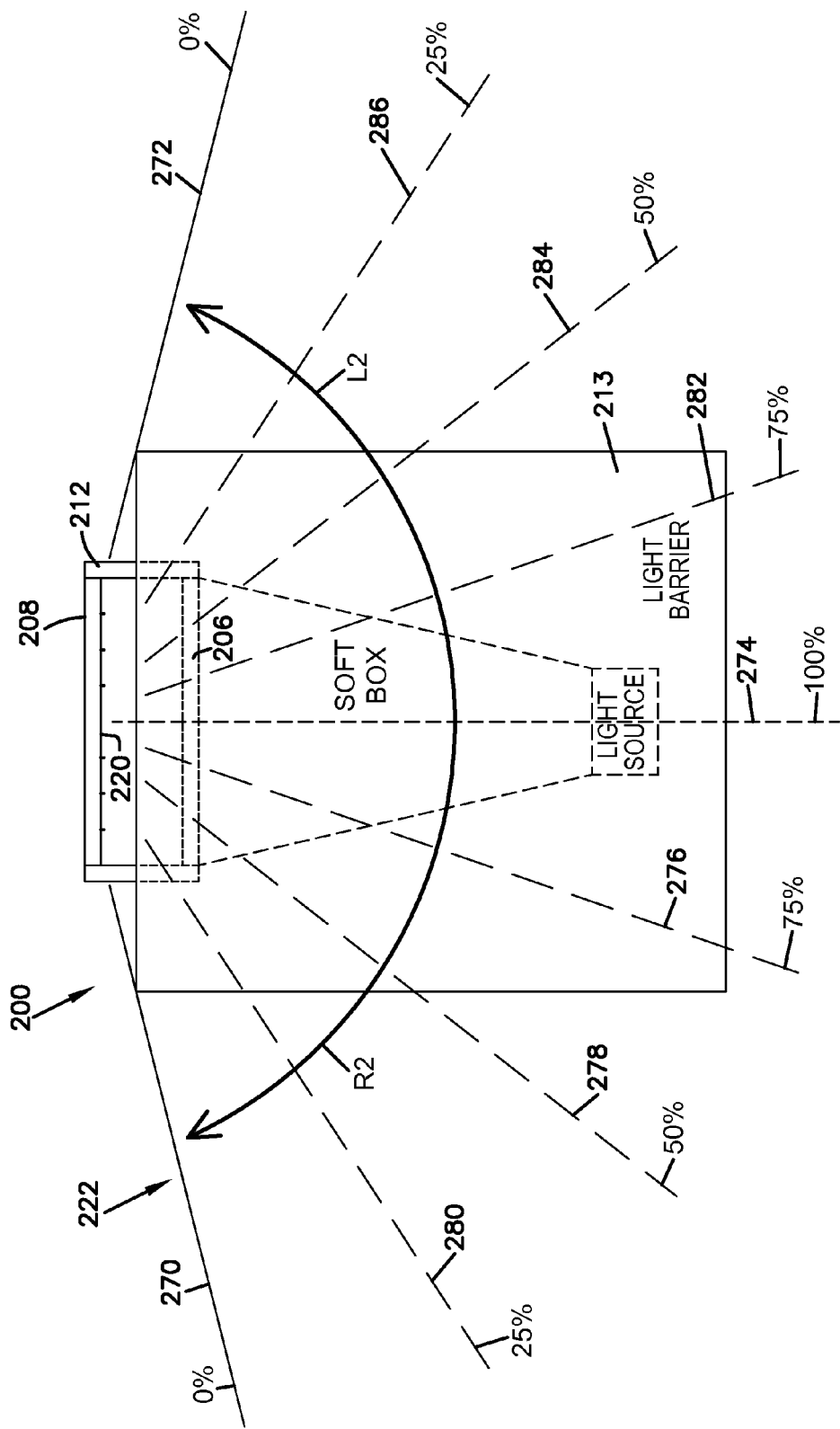
FIG. 11 is a front elevational view illustrating an example of the reflective lighting system shown in FIG. 4, and further depicting light output towards the left and right side directions.

FIG. 11 is a front elevational view illustrating an example of the reflective lighting system shown in FIG. 4, and further depicting the light output toward the left and right side directions.

The example reflective lighting system 200 shown in FIG. 11 includes the light source 202, the soft box 204 with diffusion panel 206, reflector 208, light absorbing material 210, support structure 212, and light barrier 213. The light (L) emitted from the reflective lighting system 200 is also shown.

The reflective lighting system 200 generates and outputs light L to illuminate a subject space 222, in which the one or more subjects will be positioned during a photography session.

The configuration of the reflective lighting system 200 defines boundaries of the light L. Specifically, FIG. 11 depicts the light output in the left and right side directions of the light L emitted from the reflective lighting system 200. (The terms "left" and "right" as used herein are defined from the perspective of the reflective lighting system 200.) The light emitted toward the right side is bounded by the edge 270, while the light emitted toward the left side is bounded by the edge 272. The right and left edges 270 and 272 are defined by edges of the diffusion panel 206 and reflector 208, in a similar manner to the proximal and distal edges 230 and 232 (discussed above with reference to FIG. 5). The light output also has a central axis 274 that is aligned with centers of the reflector 208 and diffusion panel 206.

A subject positioned within the subject space 222 and aligned with the central axis 274 is illuminated by the entire diffusion panel 206 by its reflection from the reflector 208. The percentage of light contribution from the diffusion panel decreases as the position is moved in the left L2 direction or the right R2 direction from the central axis. For example, three axes 276, 278, and 280 spaced between the central axis 274 and the right edge 270 receive light from 75%, 50%, and 25% of the diffusion panel respectively. Similarly, three axes 282, 284, and 286 spaced between the central axis 274 and the left edge 274 receive light from 75%, 50%, and 25% of the diffusion panel respectively.

This illustrates that different lighting conditions can be obtained by adjusting the left or right positions of subjects within the subject space in the same way as a desired lighting condition can be obtained by adjusting the forward position of the subject. Additionally, the forward and side-to-side positions can also be used in combination to obtain additional lighting conditions including the percentage contributions in each dimension. For example, a subject aligned with axis 284 (FIG. 11) and axis 254 (FIG. 5) will be illuminated by 50% of the diffusion panel 206 in one dimension and 50% of the diffusion panel 206 in the other dimension, resulting in illumination by a total area (50%*50%) of 25% of the diffusion panel.

A primary benefit of the system shown in FIG. 11 is that the wide diffusion panel 206 and reflector 208 generate a large source. The large source has a benefit of generating a softer light, rather than the harsh light generated from a point light source. Additionally, the large source reduces the light variation in the transverse direction, as shown in FIG. 11. When desired, therefore, the wide source can be used to reduce the variation in light intensity on the subjects when they move side to side in the subject space 222.

FIGS. 12-26 illustrate additional examples of the reflective lighting system 300. The example reflective lighting system 300 shows a more specific implementation of the reflective lighting system 200, shown in FIG. 4, in which the reflective lighting system is an edge light that is integrated with a photographic background.

Figure 13:
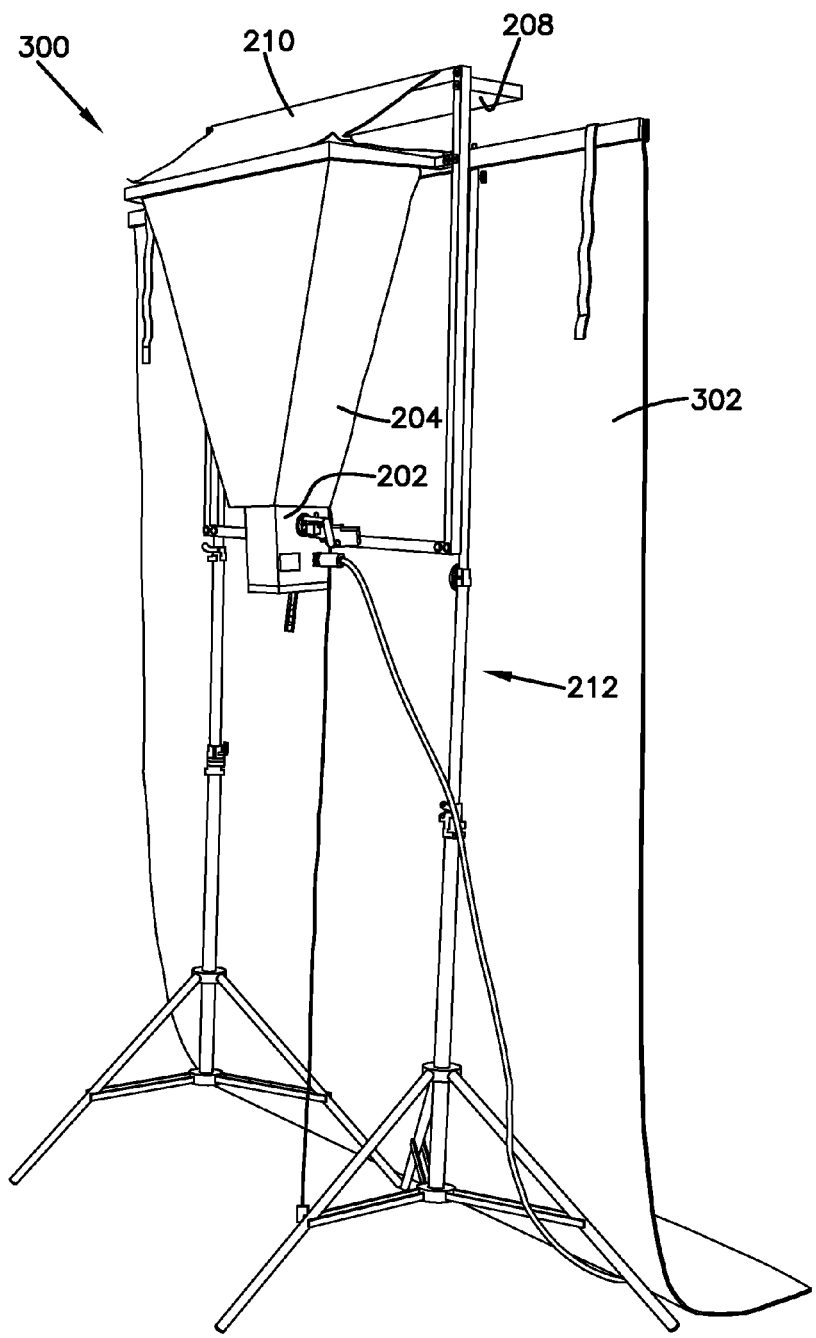
FIG. 13 is a perspective rear side view of the example reflective lighting system shown in FIG. 12.
Figure 14:
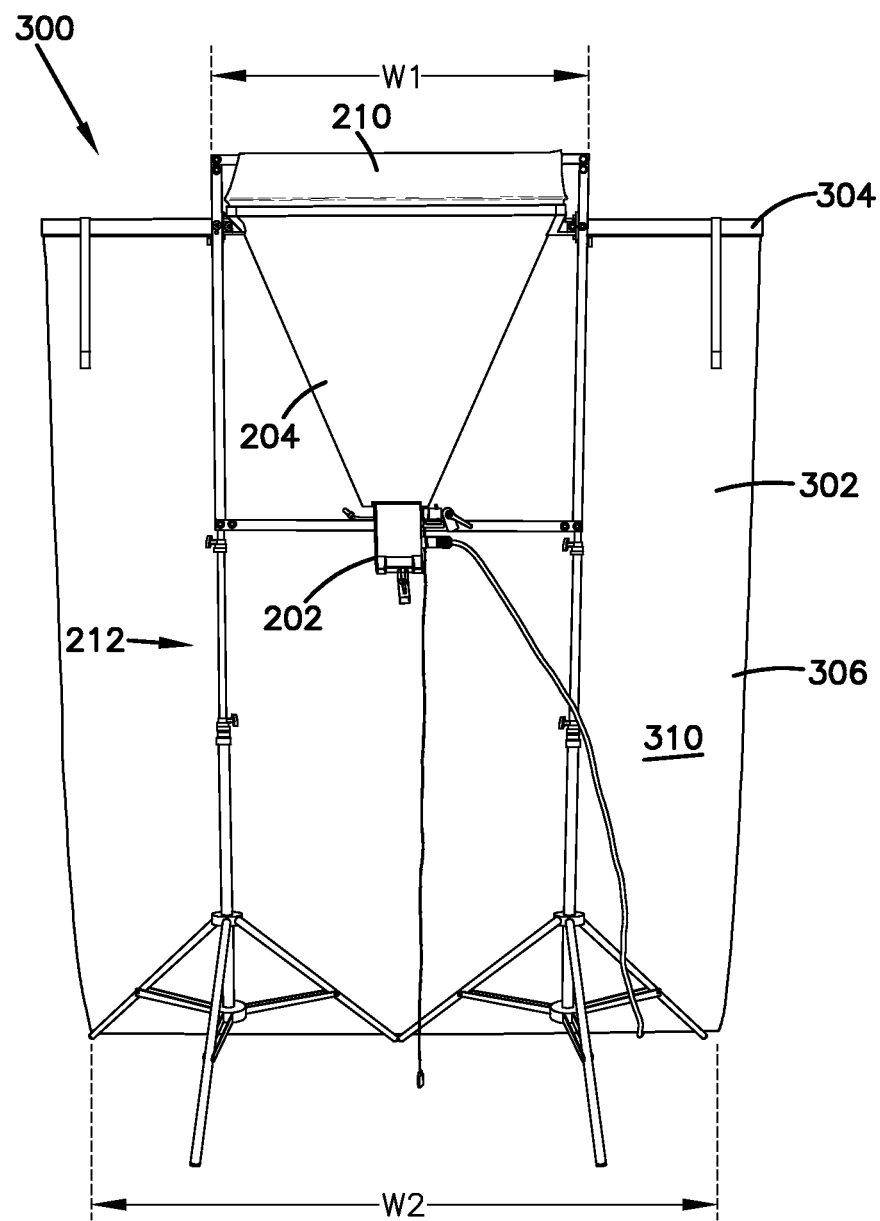
FIG. 14 is a rear perspective view of the example reflective lighting system shown in FIG. 12.
Figure 15:
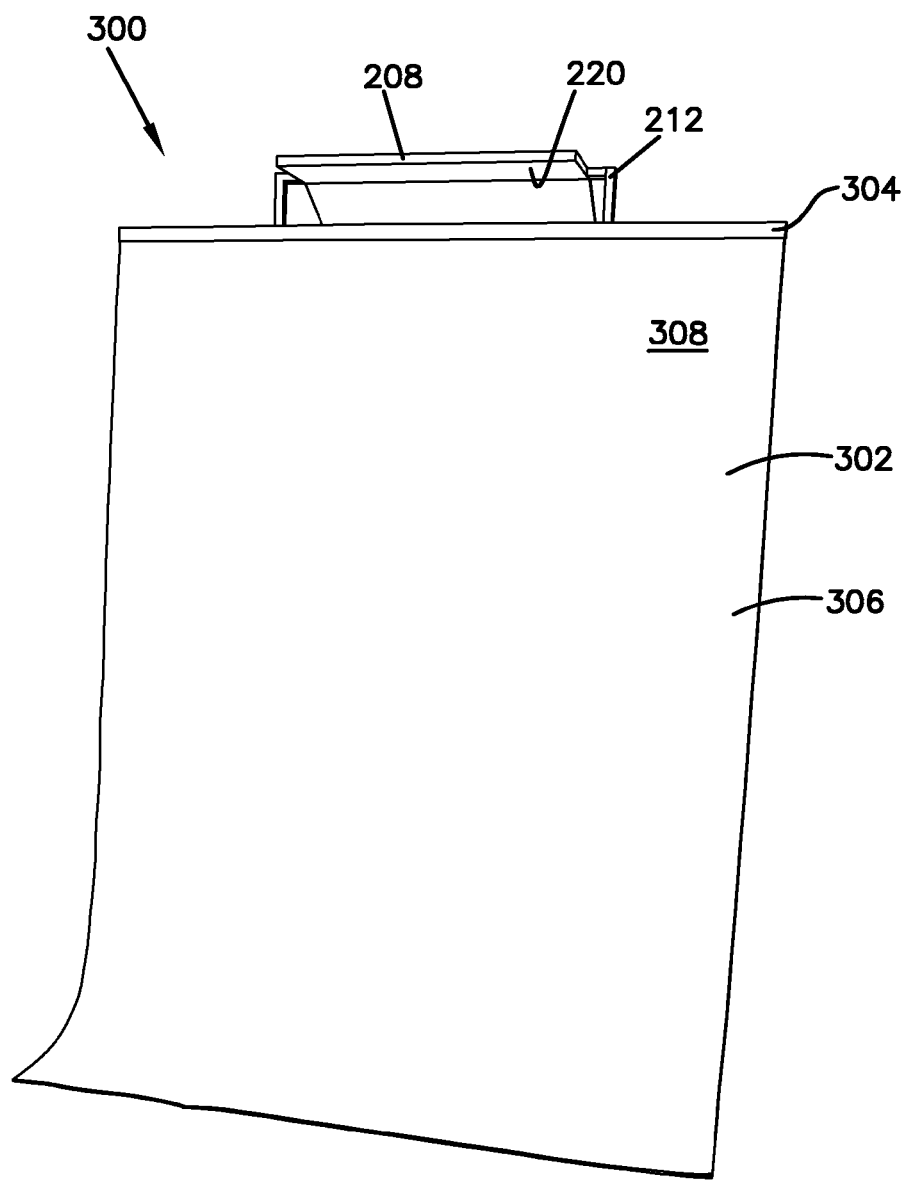
FIG. 15 is a front perspective view of the example reflective lighting system shown in FIG. 12.

Referring to FIGS. 12-15, an example of the reflective lighting system 300 is shown. FIG. 12 is a perspective side view of the reflective lighting system 300. FIG. 13 is a perspective rear side view of the reflective lighting system 300. FIG. 14 is a rear perspective view of the example reflective lighting system 300. FIG. 15 is a front perspective view of the example reflective lighting system 300.

In the illustrated example, the reflective lighting system 300 includes a light source 202, a soft box 204 including a diffusion panel 206, a reflector 208, a light absorbing material 210, and a support structure 212. Additionally, this example of the reflective lighting system 300 further includes a background 302.

An example of the light source 202 is illustrated and described in more detail with reference to FIG. 16.

Examples of the soft box 204, the diffusion panel 206, and the light absorbing material are illustrated and described in more detail with reference to FIGS. 17-20.

An example of the reflector 208 is illustrated and described in more detail with reference to FIGS. 24-26.

Exemplary dimensions for some example embodiments of the reflective lighting system 300 are illustrated and described with reference to FIGS. 12 and 14, as discussed below. Other embodiments have dimensions greater than or less than the example dimensions discussed herein, such as depending on the particular needs of the system and the applications in which it is to be used.

One of the benefits of some embodiments of the reflective lighting system 300 is its compact size that can easily fit into most spaces where photography is desired. In some embodiments, for example, the reflective lighting system 300 is a portable system that can be transported by the photographer to a customer's facility. The space available for photography at different customer facilities varies greatly, both in terms of height and floor space that is available. With respect to height, many buildings have ceiling heights that are 8 feet in height or even less. The reflective lighting system 300 has a height H1 (FIG. 12) that is less than 8 feet to permit the reflective lighting system 300 to be used in spaces having a ceiling height of 8 feet. Additionally, in some embodiments the height H1 is adjustable to permit even further lowering of the support structure in the event that ceiling heights are less than 8 feet. Other embodiments have a height H1 in a range from about 4 feet to about 12 feet, and more typically from about 6 feet to about 8 feet so that the reflector 208 is positioned above the subject while the subject is standing.

The reflective lighting system 300 has a length L3 (FIG. 12) from the rear of the soft box 204 to the front of the reflector 208. In some embodiments, the length L3 is in a range from about 1 foot to about 3 feet, and more typically in a range from about 1.5 feet to about 2.5 feet, or about 2 feet. In some embodiments an overall length L4 is defined by the legs of the support structure 212, such as in a range from about 2 feet to about 4 feet, and more typically in a range from about 2 feet to about 3 feet to provide adequate stability.

The reflective lighting system 300 has a width W1 (FIG. 14) of the upper support structure 212 in a range from about 2 feet to about 6 feet, and more typically in a range from about 2.5 feet to about 3.5 feet. In some embodiments an overall width W2 is defined by the width of the background 302, or by the width of the legs of the support structure 212. In some embodiments the with W2 is in a range from about 4 feet to about 8 feet, and more typically in a range from about 5 feet to about 7 feet.

The example length and width dimensions show that some embodiments of the reflective lighting system 300 consume little floor space when assembled, and can therefore provide a compact assembly that can be used in rooms where little space is available. In some embodiments the reflective lighting system utilizes between about 10 square feet and about 30 square feet of floor space, and more typically between about 16 and about 24 square feet of floor space when fully setup.

Referring to FIGS. 14-15, an example of the background 302 is shown. In this example, the background 302 includes a header bar 304 and fabric sheet 306 having a front surface 308 and a rear surface 310.

In some embodiments the header bar 304 is a stiff elongate member that is connected to a top edge of the fabric sheet 306. The header bar 304 is configured to be connected with the support structure 212 to support the fabric sheet 306 which drapes downward from the header bar 304 to the floor. In some embodiments the header bar 304 has a different color than the front surface 308 of the fabric material to permit detection of the header bar 304 by a camera or by subsequent processing of a digital image captured by the camera with a computing device.

In some embodiments, a distance between the top of the background (e.g., header bar 304) and the reflector 208 is less than 6 inches. The small space required between the top of the background and the reflector permits the background to be arranged very near to the ceiling, such as within about 6 to 8, or 6 to 12 inches of the ceiling. This permits tall subjects to be photographed even when the ceiling height is not much taller than the subject. In some embodiments, the distance between the top of the background and the reflector 208 is in a range from about 3 inches to about 12 inches, or in a range from about 3 inches to about 8 inches, or in a range from about 3 inches to about 6 inches.

The fabric sheet 306 is typically formed of a material that does not transmit light. For example, the fabric sheet 306 is non-transparent and non-translucent in some embodiments. This allows the fabric sheet 306 to function as the light barrier 213, previously discussed herein, to prevent light from the diffusion panel from directly illuminating the subject or the camera. The background 302 therefore operates in some embodiments to hide the diffusion panel 206 from the subject and from the camera.

The front surface 308 of the fabric sheet 306 provides a backdrop for use during a photography session. In one example embodiment, the front surface 308 of the fabric sheet 306 is configured as a blue (or green) screen, having a blue (or green) color. One example of a blue color is Klein blue. In some embodiments the blue color is obtained from DigiComp blue paint developed by Rosco Laboratories, of Stamford, Conn. Such colors can be beneficial to permit automated removal of the background, such as using chroma key techniques. In another possible embodiment, the front surface 308 has a neural color, such as gray. In yet other possible embodiments, the background is a photographic background including one or more colors or an image selected for use as a background in a photograph.

Figure 16:
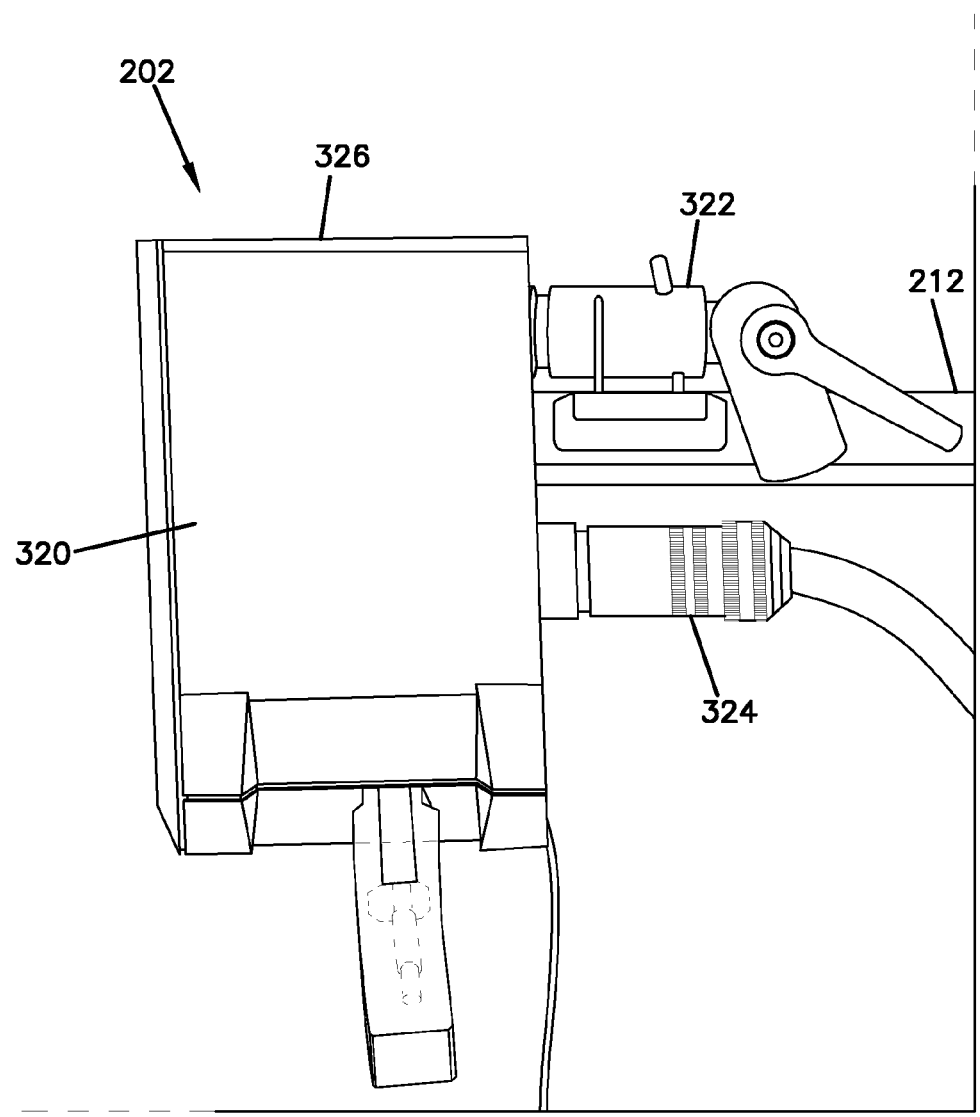
FIG. 16 is a perspective rear view of an example of a light source of the reflective lighting system shown in FIG. 12.

FIG. 16 is a perspective rear view of an example of the light source 202. The light source 202 generates the light utilized by the reflective lighting system 300 to illuminate the subject. In some embodiments, the light source includes a housing 320, a hanger 322, a power input 324, and a lens 326. Within the housing 302 (and not visible in FIG. 16), the light source 202 further includes one or more light bulbs.

In this example the housing 320 is connected to the support structure 212 by a hanger 322. More specifically, the hanger 322 is connected to the housing 320 and includes an aperture configured to be placed over a mounting pin of the support structure 212. The light source 202 can be easily connected to or removed from the support structure 212 by placing the hanger 322 on the pin, or by removing the hanger 322 therefrom.

Power is supplied to the light source 202 through a power input 324. In this example, the power input 324 includes an input port. A power supply cable can be connected to the input port to deliver power from an external source, such as mains power, to the light source 202. Some embodiments include a power supply and/or power rectifier to convert the power from one form into another for use by the light bulb. Other electronic components are included in some embodiments. Additionally, some embodiments include a power source, such as one or more batteries.

The light bulb converts electrical energy into light. Examples of a light bulb include an incandescent bulb, a fluorescent lamp, a light-emitting diode, and a discharge lamp or a xenon flashtube. Some embodiments include multiple light bulbs.

The light generated by the light bulb passes through a protective shell or lens which functions as part of the housing 320.

One example of a light source 202 is the BRONCOLOR® 450 Watt Second Monolight manufactured by Bron Elektronik AG of Allschwil, Switzerland.

Figure 17:
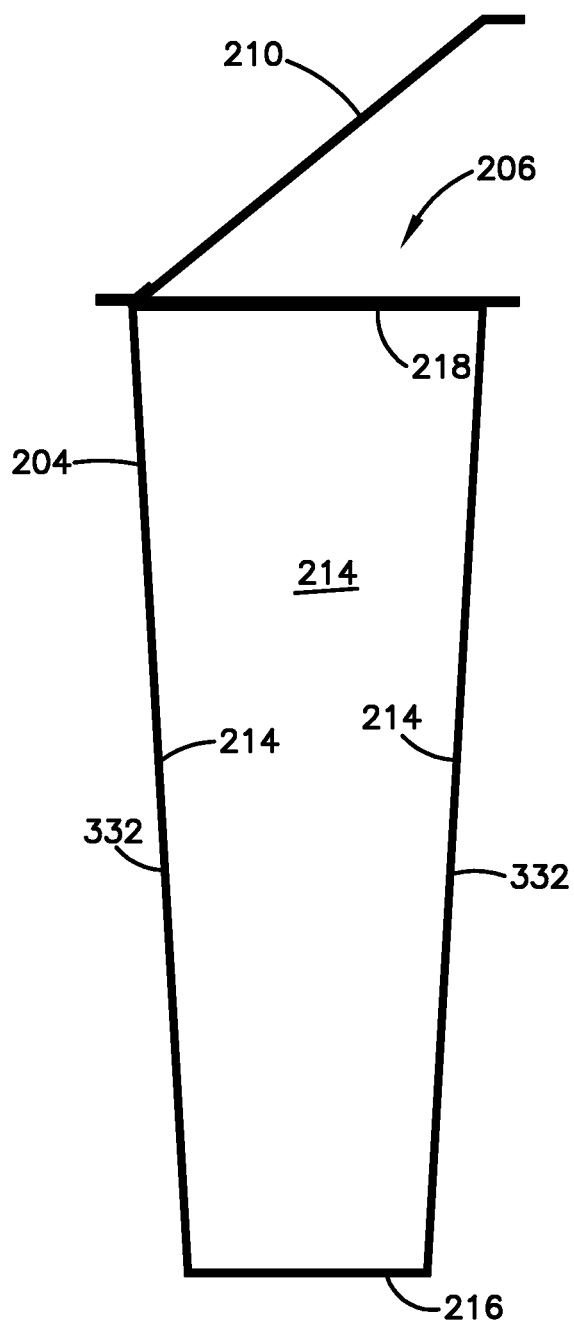
FIG. 17 is a side cross-sectional view of an example soft box, diffusion panel, and light absorbing material of the example reflective lighting system shown in FIG. 12.
Figure 18:
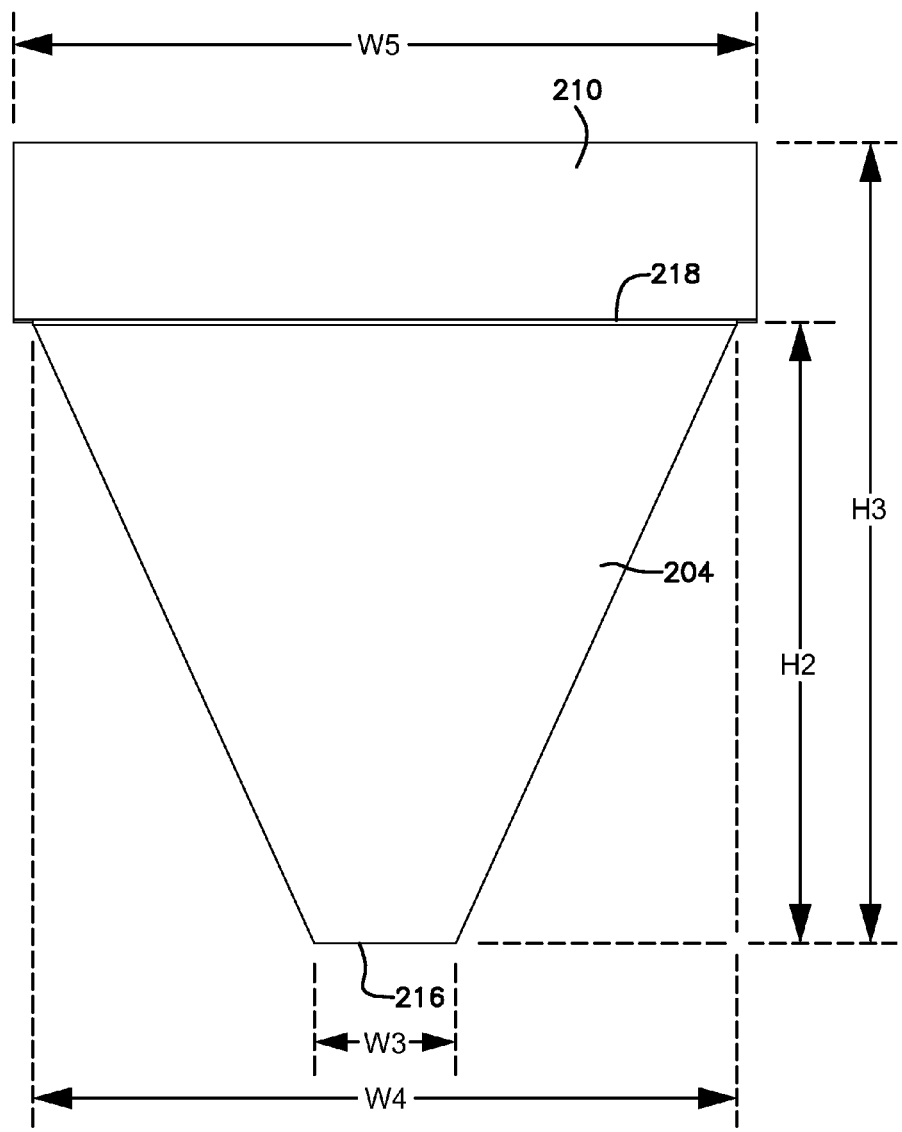
FIG. 18 is a rear elevational view of the example soft box, diffusion panel, and light absorbing material of the example reflective lighting system shown in FIG. 17.
Figure 19:
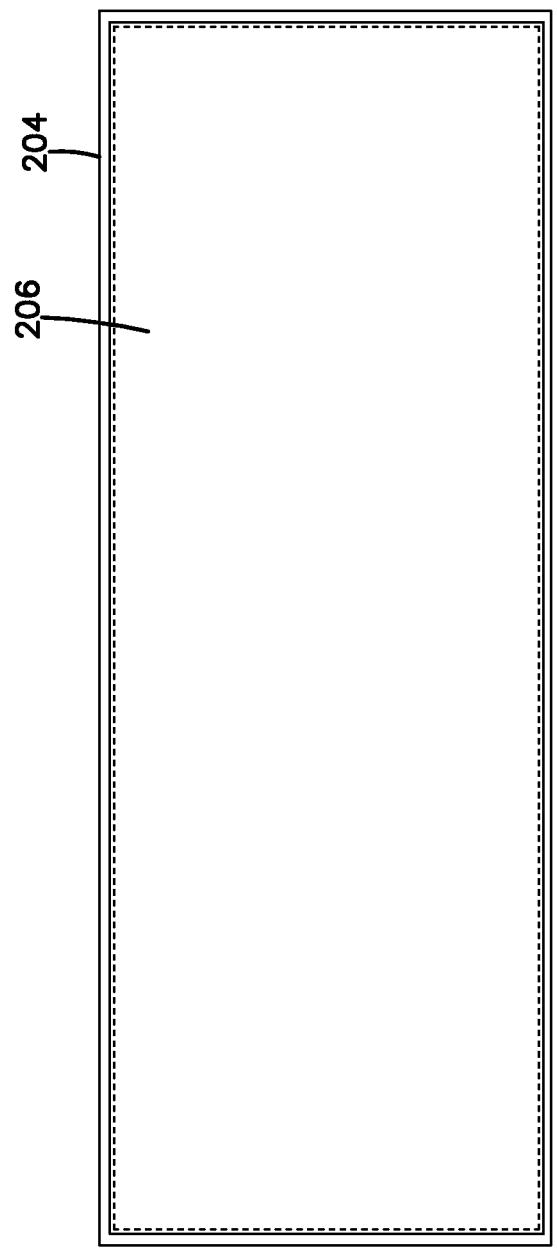
FIG. 19 is a top plan view of the example soft box, diffusion panel, and light absorbing material of the example reflective lighting system shown in FIG. 17.
Figure 20:
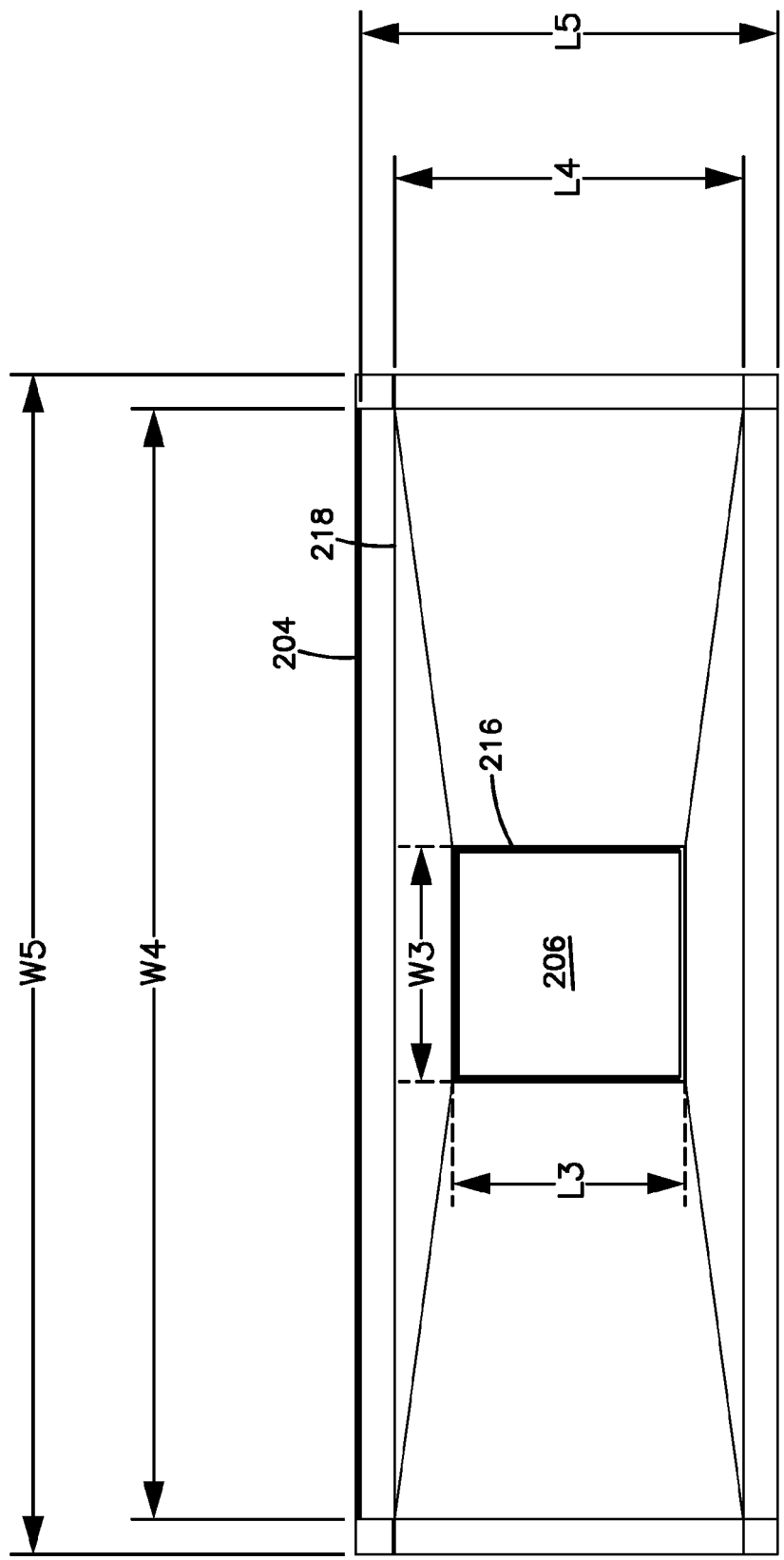
FIG. 20 is a bottom plan view of the soft box, diffusion panel, and light absorbing material of the example reflective lighting system shown in FIG. 17.

FIGS. 17-20 illustrate examples of the soft box 204, the diffusion panel 206, and the light absorbing material 210 of the example reflective lighting system 300. FIG. 17 is a side cross-sectional view. FIG. 18 is a rear elevational view. FIG. 19 is a top plan view. FIG. 20 is a bottom plan view.

The soft box 204 is formed of multiple layers including an outer fabric layer 332 and a reflective internal surface 214. The soft box 204 is formed, for example, with four sides and openings at the ends 216 and 218. The opening at the end 216 is configured to receive light from the light source 202.

The inner reflective layer is coupled to the outer fabric layer 332 and operates to scatter and reflect the light received from the light source within the soft box 204. In some embodiments the inner reflective layer is a specular, highly reflective material, which is opaque enough to stop light from passing therethrough.

In some embodiments the soft box 204 includes a lip adjacent the opening at the end 218. A fastener, such as a hook and loop fastening strip is connected to the lip to permit the soft box 204 to be securely and removably fastened to the support structure 212 (not shown in FIGS. 17-20).

The diffusion panel 206 extends across the opening at the end 218 of the soft box 204, as best seen in FIG. 19. In some embodiments the diffusion panel is sewn across the opening at the end 218 at edges to prevent light from escaping from the soft box 204 without passing through the diffusion panel 206. The diffusion panel 206 is formed of a substantially uniformly translucent material which diffuses light as the light passes through. The diffusion panel 206 therefore removes or reduces the specularity from the light source and generates a uniform light output that is emitted across the entire surface of the diffusion panel 206. In some embodiments, the diffusion panel 206 material has a tight weave, a flat finish, and is made of durable quality. In some embodiments the material does not significantly adjust the color temperature of the light source, while in other embodiments the material is configured to adjust the color temperature. The light absorbing material 210 operates to absorb light emitted from the diffusion panel 206 that is directed toward the light absorbing material 210. The light absorbing material 210 is connected at one edge to an edge of the soft box 204 adjacent the diffusion panel 206, such as by a seam. The rest of the light absorbing material 210 forms a flap, which is arranged and configured to be fastened to the reflector 20 (shown in FIG. 12). In some embodiments the distal edge of the light absorbing material 210 includes a fastener such as a hook and loop fastener strip, which permits the distal edge to be securely and removably fastened to the reflector 108. During operation, the light absorbing material 210 functions to block light from the diffusion panel 206 from shining out from the reflective lighting system 300 and undesirably illuminating other objects in the environment, such as the ceiling. Additionally, due to the light absorbing characteristic of the light absorbing material 210, light from the diffusion panel 206 is not reflected or otherwise emitted from the light absorbing material 210 to the reflector 208 (FIG. 12). This ensures that at least most of the light output from the reflective lighting system 200 passes directly from the diffusion panel 206 to the reflector 208, where it is output to illuminate the subject space 222 as discussed herein.

The size and shape of the soft box 204 is selected to provide space in which the light from the light source 202 to diverge and expand. For example, as shown in FIG. 18, some embodiments of the soft box 204 include angled sides that permit the cross-sectional size of the light beam from the light source to expand from approximately the size of the opening at end 216 to the size of the opening at end 218.

As one example, the soft box 204 has an opening at end 216 having a width W3, and an opening at end 218 having a width W4. The width W3 is in a range from about 4 inches to about 8 inches, or about 6 inches. The width W4 is in a range from about 24 inches to about 36 inches, or about 29 inches. A height H2 of the soft box 204 is in a range from about 16 inches to about 72 inches, or more typically in a range from about 20 inches to about 48 inches, or about 26 inches.

An overall height H3 of the soft box 204 and light absorbing material 210, when installed on the support structure 212 is in a range from about 20 inches to about 76 inches, or more typically in a range from about 24 inches to about 52 inches, or about 32 inches. An overall width W5 is in a range from about 26 inches to about 38 inches, or about 31 inches.

The height H4 is a height of the light absorbing material 210, and is also the distance between the diffusion panel 206 and the reflector 208. In some embodiments, the height H4 is less than 6 inches. In some embodiments, the distance H4 is in a range from about 3 inches to about 12 inches, or in a range from about 3 inches to about 8 inches, or in a range from about 3 inches to about 6 inches.

Exemplary lengths are illustrated in FIG. 20, including a length L3 of the opening at end 216, a length L4 of the opening at the end 218, and an overall length L5. Length L3 is in a range from about 4 inches to about 8 inches, or about 6 inches. Length L5 is in a range from about 6 inches to about 12 inches, or about 9 inches. Length L6 is in a range from about 6 inches to about 14 inches, or about 11 inches.

Other embodiments have dimensions greater than or less than the example dimensions discussed herein, such as depending on the particular needs of the system and the applications in which it is to be used.

FIGS. 21-23 illustrate an example of a frame 340 portion of the soft box 204. FIG. 21 is a front view of the frame 340. FIG. 22 is a top view of the frame 340. FIG. 23 is a rear view of the frame 340.

The frame 340 provides a rigid structure for the supporting the soft box 204. The frame 340 is configured to be connected to the support structure 212, shown in FIG. 12.

In some embodiments, the frame 340 includes one or more fasteners 342, such as hook and loop strips, as best seen in FIG. 22, which are arranged along top surfaces of the frame 340. The fasteners 342 are positioned for connection with the corresponding fasteners provided on the soft box 204 to securely and removably connect the soft box 204 with the frame 340.

FIGS. 24-26 illustrate an example of the reflector 208. FIG. 24 is a bottom plan view. FIG. 25 is a front elevational view. FIG. 26 is a top plan view.

In this example, the reflector 208 includes a frame 350 and a reflective sheet 352. The frame 350 is configured to support the reflective sheet 352 which is fastened thereto with a fastener such as adhesive. The frame 350 is arranged and configured to connect with the support structure 212.

The reflective sheet 352 is a sheet of material having a reflective surface 220. Preferably, the reflective surface 220 is a non-diffusive material that specularly reflects light from the diffusion panel 206. One example of a suitable material is aluminum having a finely polished surface 220. One benefit of finely polished aluminum is that it is non-breakable, unlike glass commonly used with mirrors. However, a mirror could also be used in other embodiments.

As best seen in FIG. 26, some embodiments include a fastener 354, such as a hook and loop fastener. The fastener 354 is arranged along a rearward member of the frame 350 and is positioned for attachment with the distal end of the light absorbing material 210 to support the distal end of the light absorbing material 210 on the frame 350 in a removable fashion.

FIGS. 27-33 illustrate an example method of setting up a reflective lighting system 200.

Figure 27:
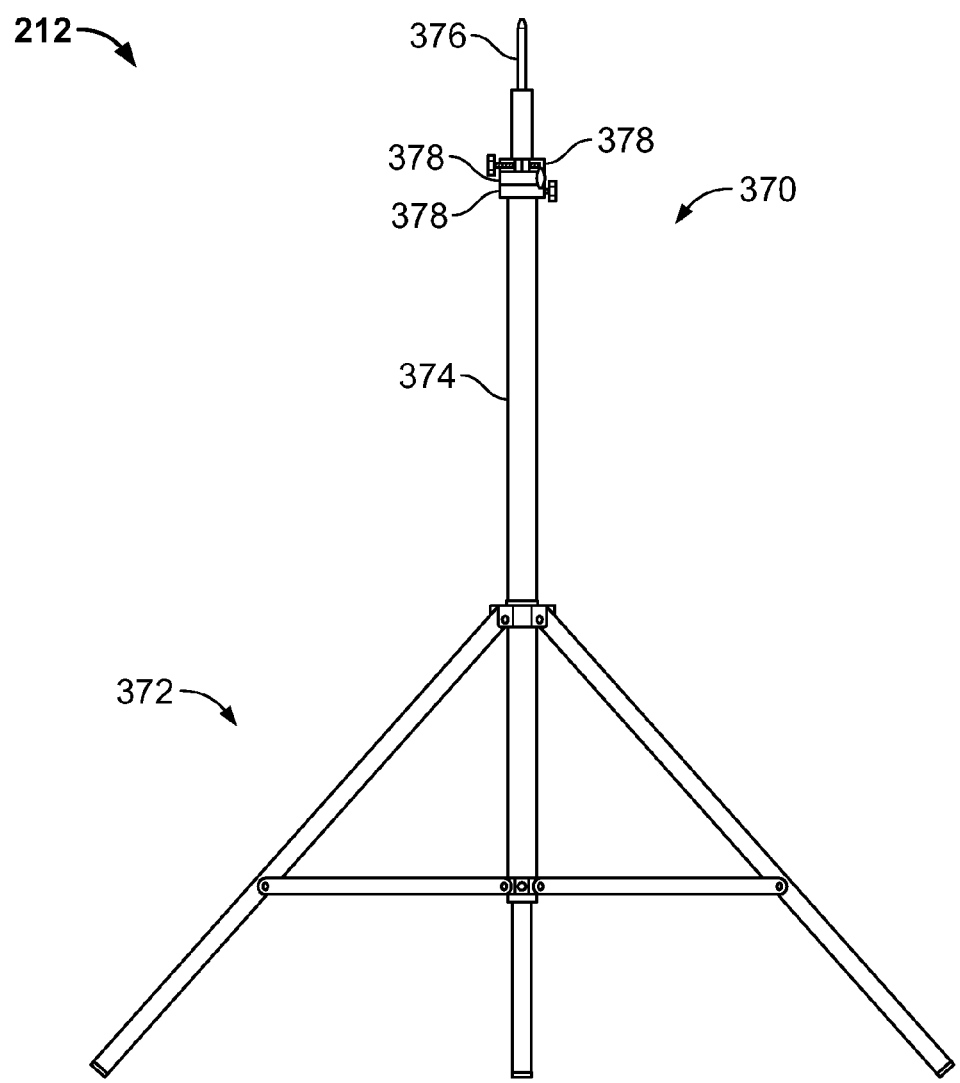
FIG. 27 is a side view of a portion of an example reflective lighting system at the beginning of a setup process.

FIG. 27 is a side view of an example portion of the support structure 212. In this example, the portion of the support structure 212 includes a tripod support 370. The tripod support 370 includes a base assembly 372, an extendable support arm 374, and a pin 376.

The base assembly 372 is configured to be placed on the ground to support the rest of the tripod support 370 in a vertical orientation. The ground can include a floor, floor covering, roadway, vehicle, portion of the earth (including soil, grass, etc.), or any other suitable surface. The base assembly 372 includes, for example, an expandable tripod configuration with three support legs. The base assembly 372 can be collapsed for compact storage during transportation.

The expandable support arm 374 forms the primary vertical support member for the tripod support 370. In this example, the extendable support arm 374 includes a plurality of telescoping members. Fasteners 378, such as clamps, positioned at joints between the telescoping members can be adjusted to selectively extend or fasten the telescoping members between a retracted height and an extended height.

A vertically extending pin 376 is arranged at an end of the expandable support arm 374 to support the frame assembly 380 and background 302 (not shown in FIG. 27) thereon, as discussed in further detail below.

Figure 28:
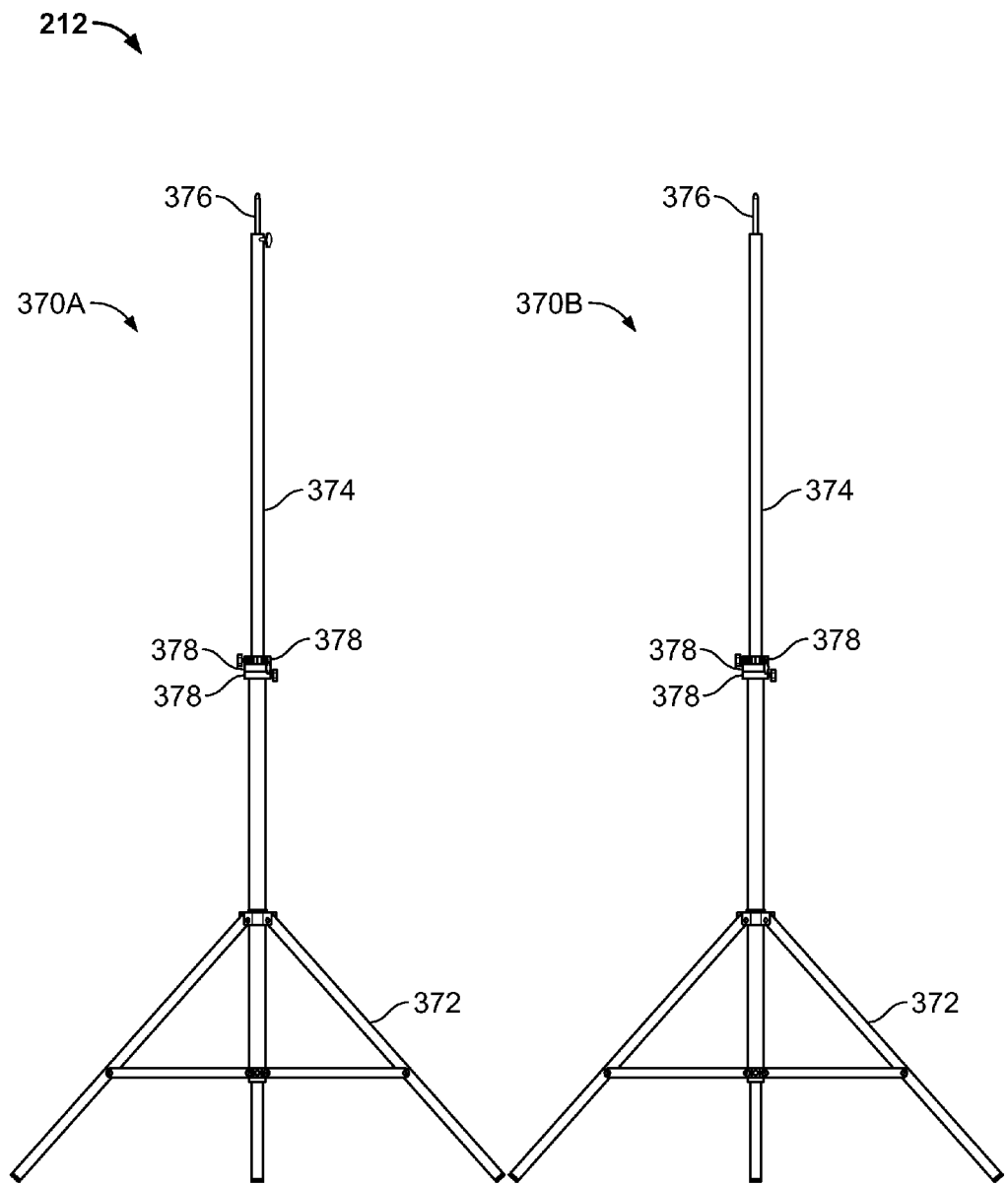
FIG. 28 is a side view illustrating additional portions of the example reflective lighting system of FIG. 27.

FIG. 28 is a side view showing additional portions of the support structure 212. In this example, two tripod supports 370A and 370B are shown.

To begin setup of the reflective lighting system 100, the base assemblies 372 of the tripod supports 370A and 370B expanded and the tripod supports 370A and 370B are positioned on the ground and spaced an appropriate distance apart from each other.

The expandable support arms 374 can also be expanded to a comfortable height by adjusting the clamps 378 and expanding the expandable support arms 374 to the desired positions. The clamps 378 are then engaged to maintain the expandable support arms 374 at that position.

Figure 29:
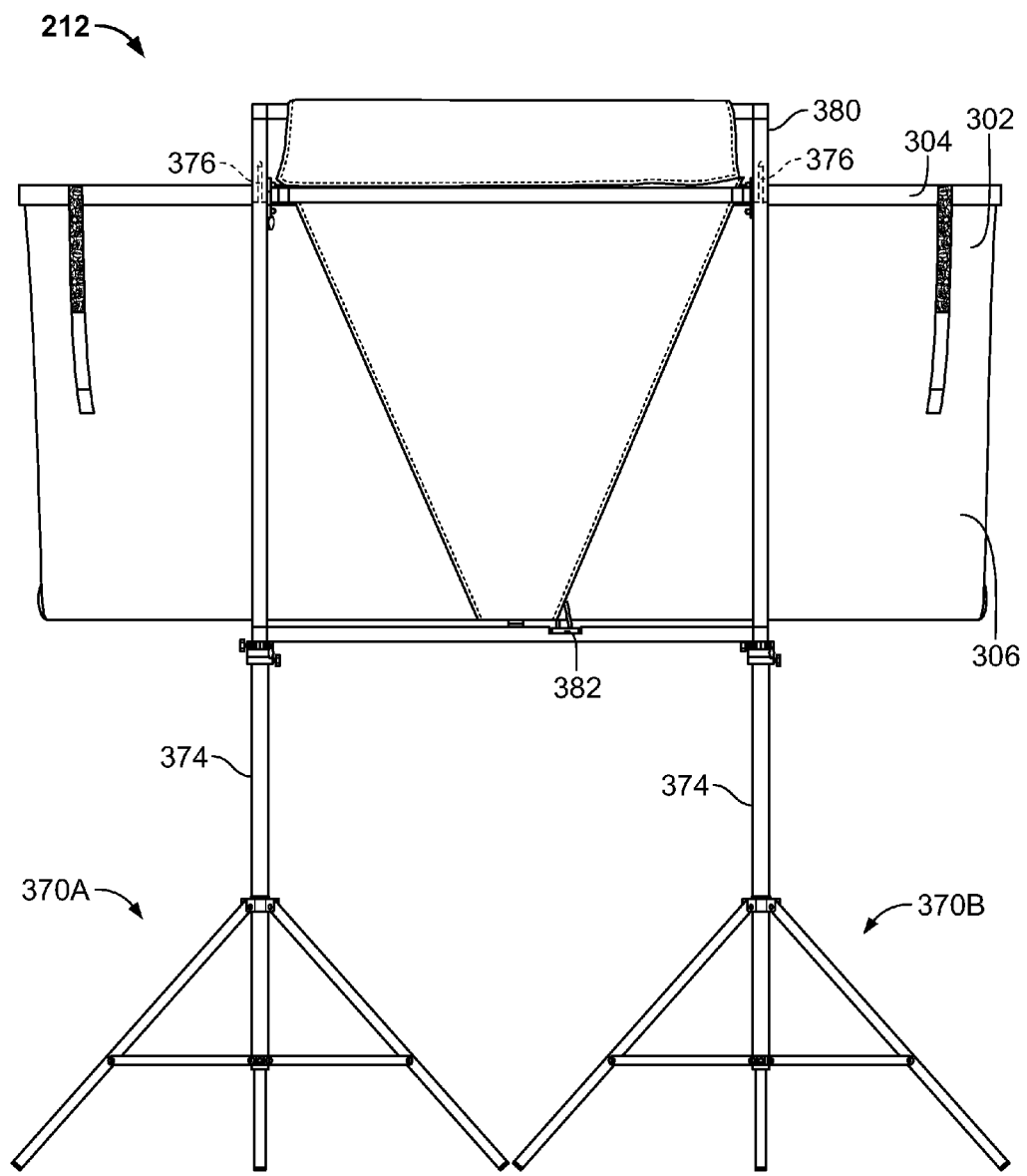
FIG. 29 is a rear view illustrating additional portions of the reflective lighting system of FIG. 27.
Figure 30:
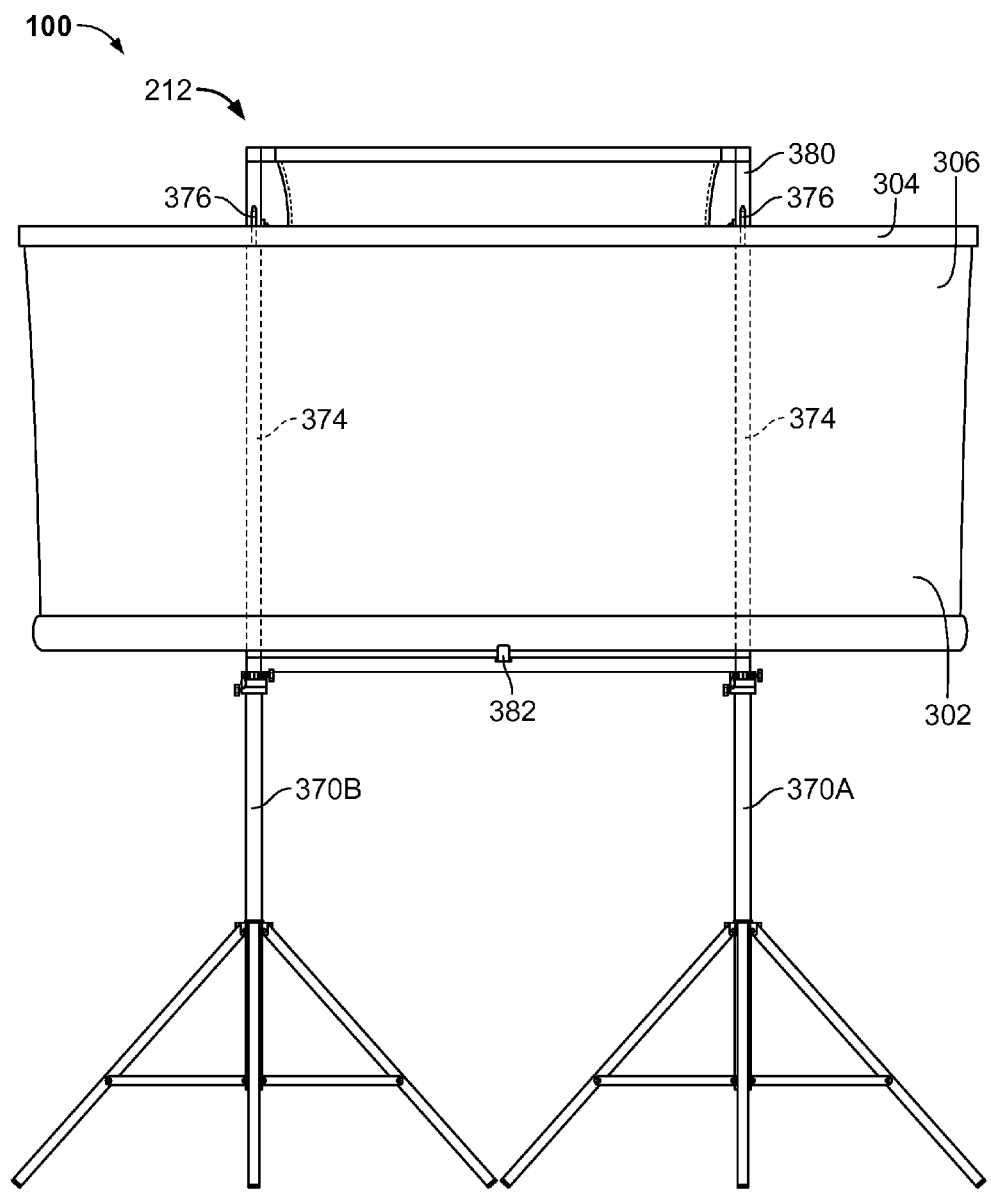
FIG. 30 is a front view illustrating the additional portions shown in FIG. 29.

FIGS. 29 and 30 illustrate additional portions of the reflective lighting system 100, during the example setup process. FIG. 29 is a rear view of portions of the reflective lighting system 100, and FIG. 30 is a front view of same. Several of the otherwise hidden portions are illustrated in broken lines for clarity. The illustrated portions of the reflective lighting system 100 include the support structure 212 and the background 302. The support structure 212 includes the tripod supports 370A and 370B and a frame assembly 380.

To continue the assembly, the frame assembly 380 is arranged on the tripod supports 370A and 370B, such as by placing brackets of the tripod supports 370A and 370B over the pins 376 until it comes to rest at the ends of the expandable support arms 374. In some embodiments the frame assembly includes frames 340 and 350.

If not previously installed, the soft box 204, the diffusion panel 206, and the light absorbing material 210, all shown in FIGS. 17-20 can be installed at this time, such as by arranging these components at appropriate locations on the frames 340 and 350 and fastening them with the hook and loop fasteners, or other fastening mechanism.

A background support bracket 382 of the frame assembly 380 is rotated so that it extends frontwards from the frame assembly 380. When in this position, the background support bracket 382 also extends rearward into the space in which the light source 202 will be positioned to discourage assembly of the light source 202 until a later step.

The background 302 is then installed. The background 302 is typically stored in a rolled configuration to avoid wrinkling or otherwise damaging the photographic surface and also to reduce space.

In some embodiments the background 302 includes a header bar 304 and a fabric sheet 306. The header bar 304 includes slots that extend vertically through the header bar 304 that are sized to receive pins 376. To continue the setup process, the header bar 304 is positioned over the tripod supports 370A and 370B and the pins 376 are inserted into the slots in the header bar 304. The header bar 304 is lowered until it comes to rest on the brackets of the frame assembly 380 at the top of the expandable support arms 374.

The fabric sheet 306 is then partially unrolled and is placed on the background support bracket 382, which supports the partially unrolled fabric sheet 306 off of the ground.

Figure 31:
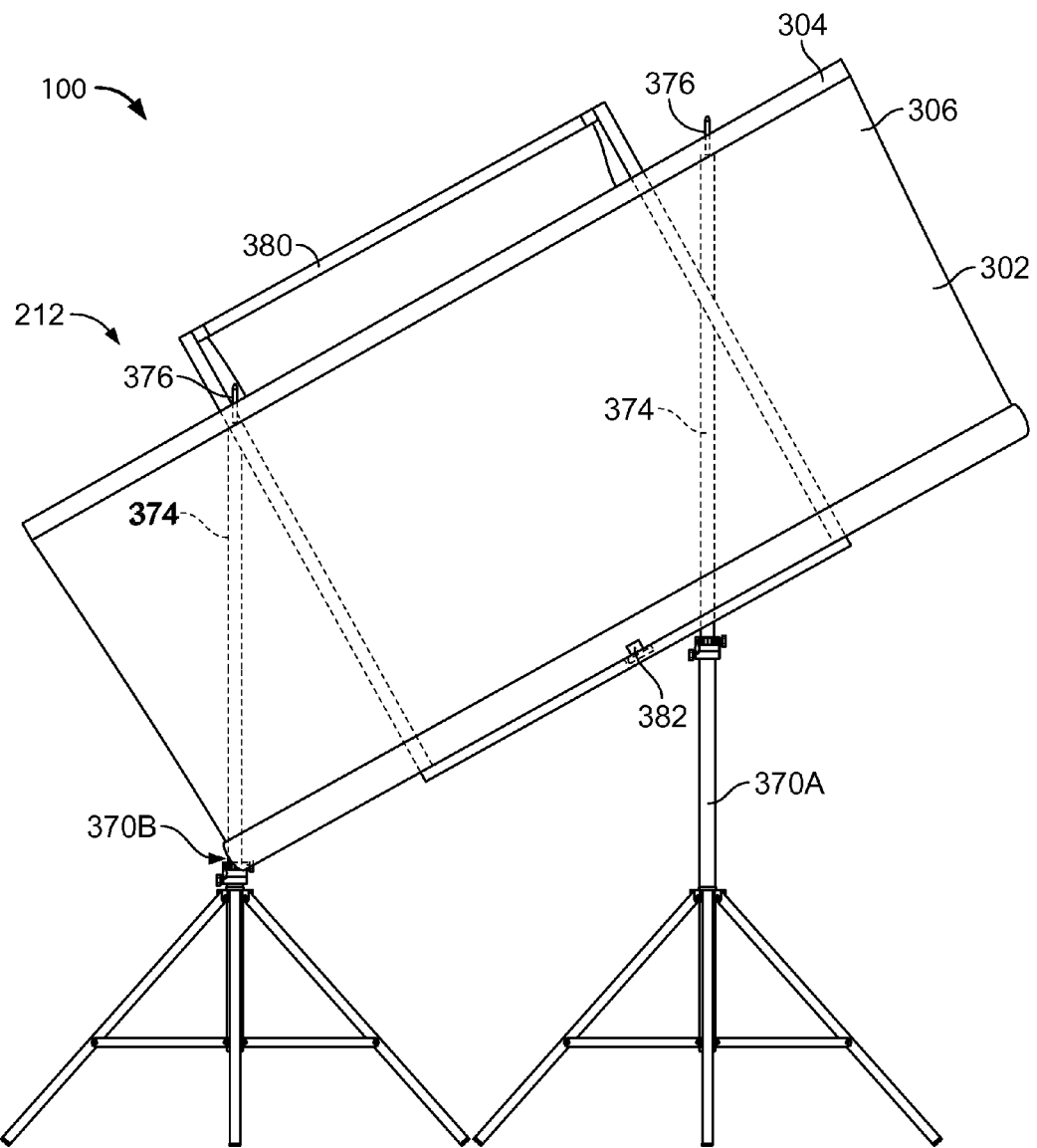
FIG. 31 is a front view illustrating further portions of the example reflective lighting system of FIG. 27.

FIG. 31 is a front view illustrating further portions of the reflective lighting system 200 during the example setup process. Several of the otherwise hidden portions are illustrated in broken lines for clarity.

The support structure 212 can then be elevated to full height by expanding the expandable support arms 374. One feature that allows this process to be completed much more easily is that the slots in the header bar 304 are sized much wider than the diameters of pins 376. Because of this, the expandable support arms 374 of the tripod supports 370A and 370B can be expanded individually, such as shown in FIG. 31 in which the tripod support 370A has been raised, while the tripod support 370B has not been raised. The pin 376 is permitted to slide and move within the slots of the header bar during this process. Furthermore, in some embodiments the frame assembly 380 is only connected to the pins 376 at two points, which permits the frame assembly 380 to pivot during this process. After tripod support 370A is elevated, the tripod support 370B is also elevated.

Figure 32:
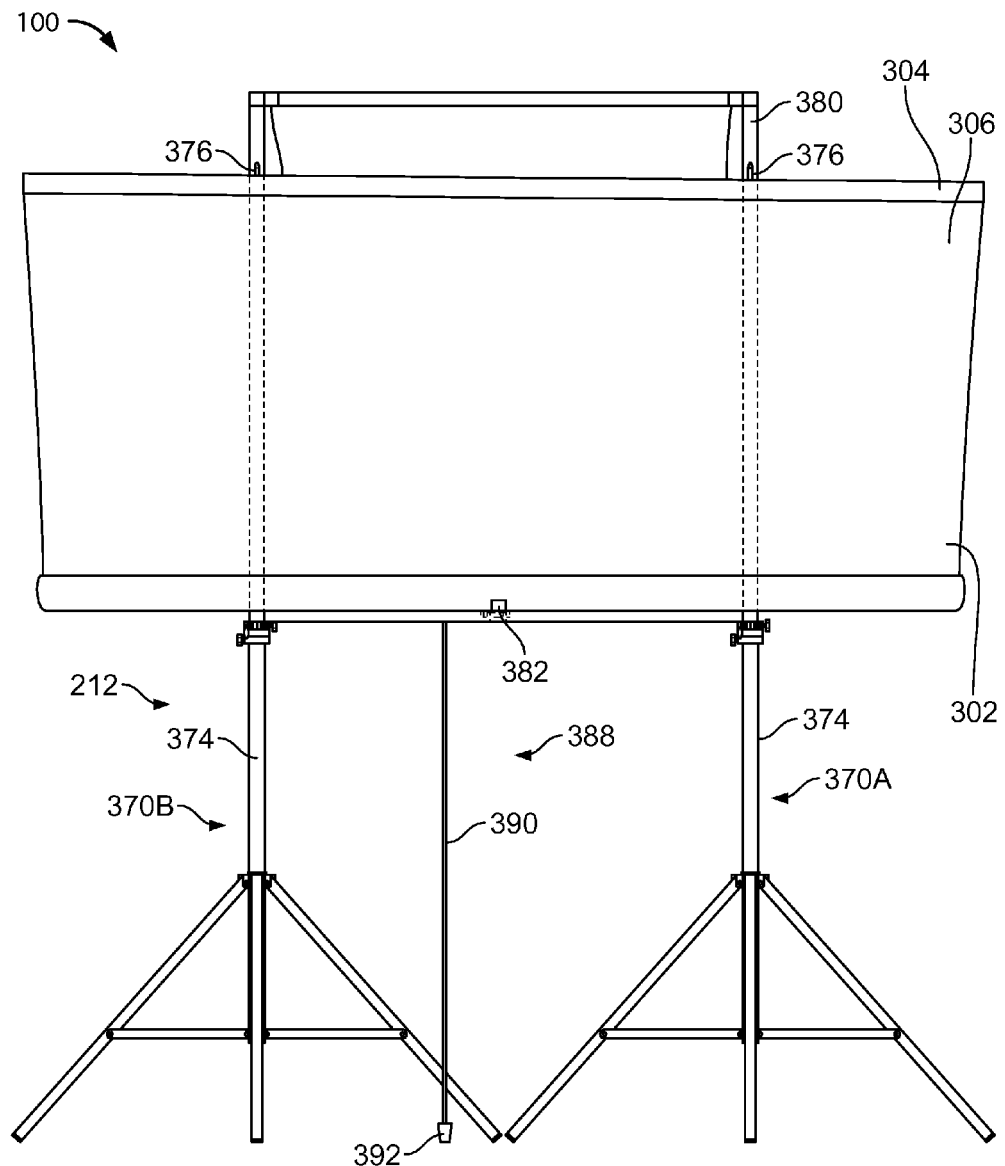
FIG. 32 is a front view illustrating additional portions of the reflective lighting system of FIG. 27.

FIG. 32 is a front view illustrating additional portions of the reflective lighting system 200 during the example setup process. Several of the otherwise hidden portions are illustrated in broken lines for clarity.

The elevation of the expandable support arms 374 of the tripod supports 370A and 370B continues as discussed with reference to FIG. 31, until it reaches the desired height, such as shown in FIG. 32. In some embodiments, a height guide 388 is provided to assist the user in elevating the support structure 212 to the appropriate height. In this example, the height guide 388 is connected to the background support bracket 382 and includes a string 390 and a weight 392. The support structure 212 is elevated until the string 390 is straight is tight and the weight 392 is just elevated above or touching the ground.

Figure 33:
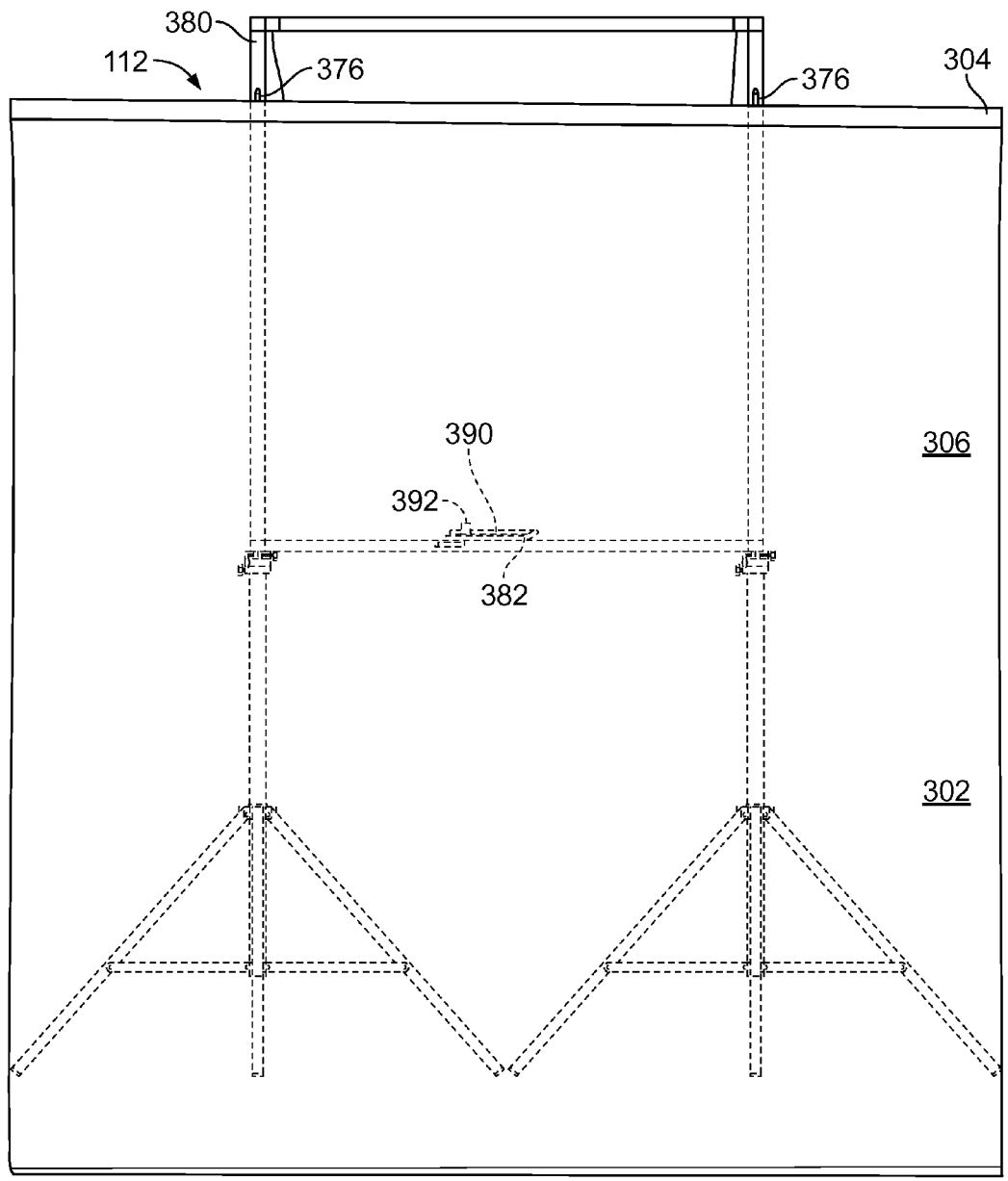
FIG. 33 is a front view illustrating the example reflective lighting system of FIG. 27 at the conclusion of the setup process.

FIG. 33 is a front view illustrating the reflective lighting system 200 at the conclusion of the setup process. Several of the otherwise hidden portions are illustrated in broken lines for clarity.

Once the support structure 212 has been elevated to the desired position, the height guide 388 can then be wound up and stowed on the background support bracket 382.

The rolled portion of the background fabric 306 can then be picked up and the background support bracket 382 rotated to the retracted position where it is out of the way of the background 302 and the light source 202. The background 306 is then unrolled to the ground.

A benefit of the process discussed above is that the elevating of the support structure 212 can be accomplished without the weight of the light source 202. As a result, relatively little effort is required to raise the support structure 212. Once elevated, the light source 202 can then be installed on the frame assembly 380, such as shown in FIGS. 14 and 16.

Figure 34:
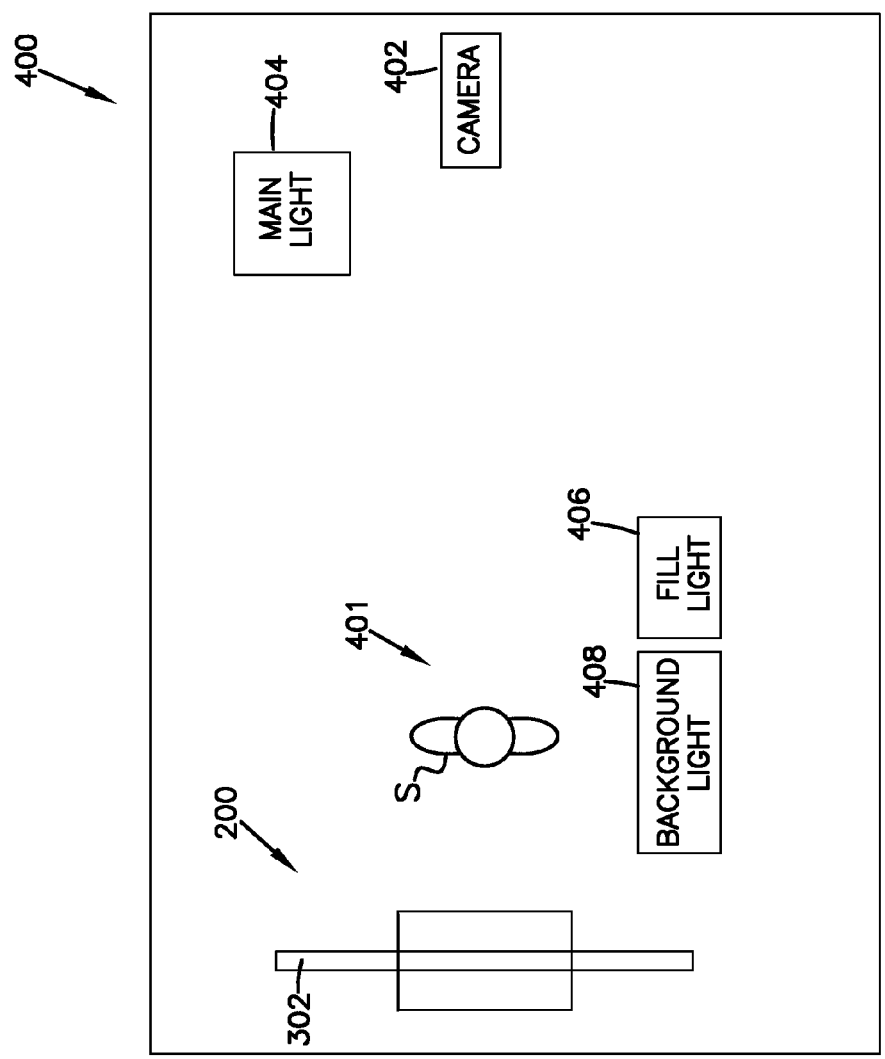
FIG. 34 is a block diagram and schematic plan view of an example photography station including an example reflective lighting system as an edge light.

FIG. 34 is a block diagram and schematic plan view of an example photography station 400 including an example reflective lighting system 200 as an edge light. In this example, the photography station 400 is configured to capture a photograph of a subject S when the subject S is positioned within the subject space 401. In some embodiments the subject space 401 is marked on the ground, such as by a sticker, graphic, mat, etc.

In this example, the photography station 400 includes a camera 402, a main light 404, a fill light 406, a background 408, and a reflective lighting system 200.

The camera is a film or digital camera operable to capture a photograph of a subject S. The subject S can be a person, animal, or inanimate object, for example. The camera 402 is oriented toward the subject S and the background 302, and the subject S is positioned forward of the background 302 toward the camera so that the background 302 and subject S are both within the field of view.

The main light 404 provides the primary light source for the photography session, to illuminate forward features of the subject S.

The fill light 406 is included in some embodiments as a secondary light source that operates to fill in shadows on the subject S cast by the main light 404. In some embodiments the fill light 406 includes a light source, while in other embodiments the fill light 406 includes a diffused reflective surface that reflects light from the main light 404.

The background light 408 is provided in some embodiments to illuminate the background 200.

The reflective lighting system 200 is arranged behind the subject S is primarily hidden from the view of camera 402 by background 302. The reflective lighting system 200, in this example, acts as an edge light, and more specifically as a hair light to illuminate edge features, including the top of the subject's head.

Figure 35:
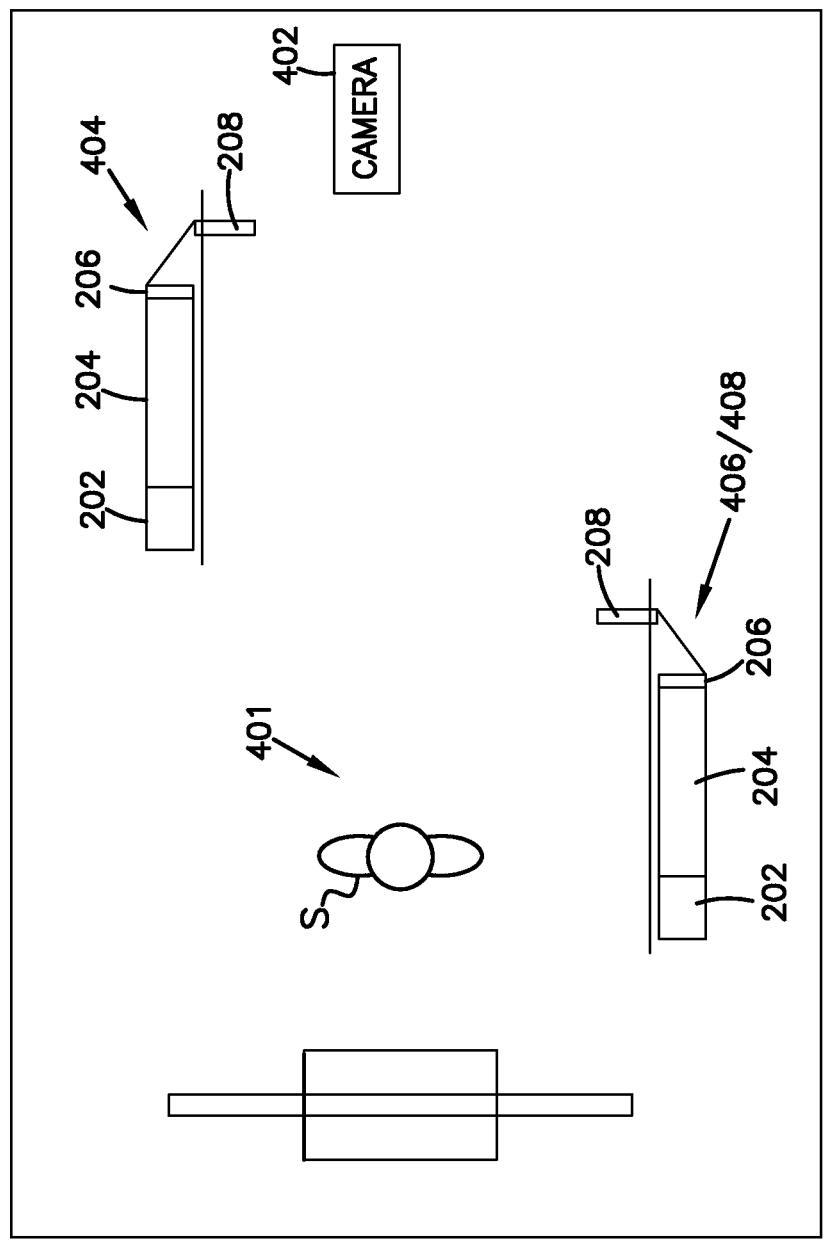
FIG. 35 is a block diagram and schematic plan view of another example photography station including multiple reflective lighting systems.

FIG. 35 is a block diagram and schematic plan view of another example photography station 400. In this example, multiple reflective lighting systems 200 are configured as various different lighting systems, and specifically as the edge light 200, and also as the main light 404, and one or more of the fill light 406 and background light 408. In this example, the main light 404 and fill/background lights 406/408 are flipped to one side so that the light emitted therefrom is directed horizontally toward the subject space 401 instead of downward as with the example edge light.

Figure 36:
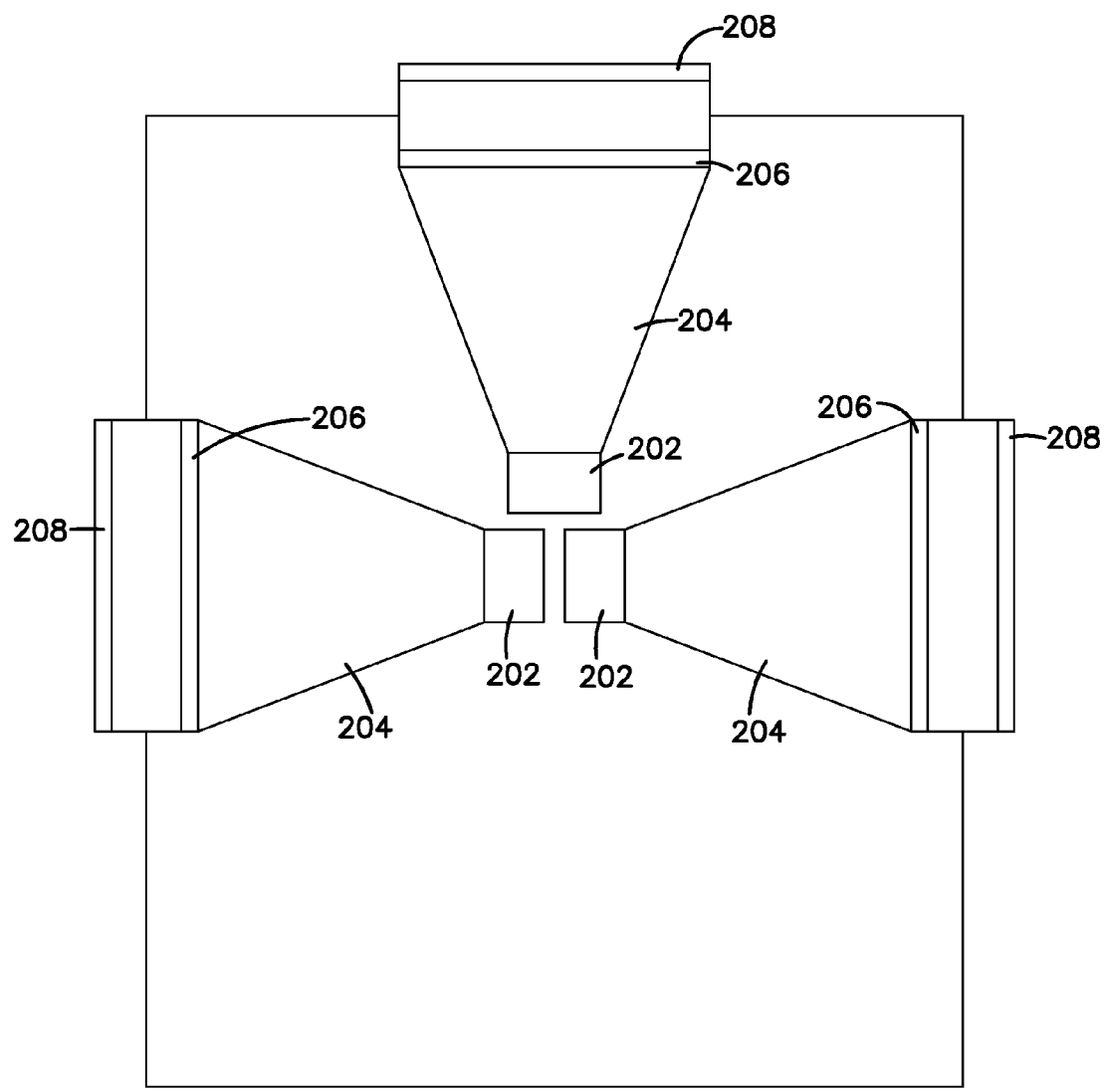
FIG. 36 is a schematic rear view of another example reflective lighting system.

FIG. 36 is a schematic rear view of another example reflective lighting system 500. In this example, the reflective lighting system 500 includes multiple of the reflective lighting systems 200, including a hair light 502, a side light 504, and a side light 506. Each of the lights 502, 504, and 506 include a light source 202, soft box 204, diffusion panel 206, and reflector 208, in this example. This example illustrates that one or more reflective lighting systems 200 can be included, and can be oriented in different directions to obtain the desired lighting effect. A support structure is omitted in FIG. 36 for ease of illustration.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A photographic lighting system configured to illuminate a subject space, the photographic lighting system comprising:
a diffusion panel configured to receive light from a light source;
a light barrier positioned adjacent the diffusion panel to block light from the diffusion panel from the subject space; and
a reflector positioned to receive light from the diffusion panel and redirect the light from the diffusion panel toward the subject space.

2. The photographic lighting system of claim 1, wherein facing surfaces of the diffusion panel and the reflector are parallel.

3. The photographic lighting system of claim 1, further comprising the light source and a soft box, wherein the softbox has a reflective interior and is positioned between the light source and the diffusion panel.

4. The photographic lighting system of claim 3, wherein the reflector is offset from a central axis of the soft box extending from the light source through the diffusion panel.

5. The photographic lighting system of claim 3, wherein the soft box has a cross-sectional area that increases from a first end arranged to receive light from the light source to a second end connected to the diffusion panel.

6. The photographic lighting system of claim 1, wherein the light barrier is a photographic background, and wherein a space between a top of the photographic background and the reflector is less than 6 inches.

7. The photographic lighting system of claim 1, further comprising a support structure supporting the diffusion panel, the light barrier, and the reflector.

8. The photographic lighting system of claim 1, wherein an intensity of light output from the reflector and measured along a subject axis increases as the distance increases.

9. A reflective lighting system for illuminating a subject space for photography, the reflective lighting system comprising:
- a light source;
- a soft box having a reflective interior and first and second opposing ends, the soft box being configured to receive light from the light source at the first end;
- a diffusion panel arranged across the second end of the soft box;
- a reflector positioned to receive light from the diffusion panel and reflect the light toward the subject space; and
- a light barrier positioned between the diffusion panel and the subject space to block light from the diffusion panel from directly illuminating the subject space.

10. The reflective lighting system of claim 9, further comprising a support structure supporting the light source, the diffusion panel, and the reflector in spaced relationship to each other.

11. The reflective lighting system of claim 10, wherein the support structure comprises a frame.

12. The reflective lighting system of claim 10, wherein the support structure further comprises a base assembly configured to be placed on a ground surface and is configured to support the reflectively lighting system in a vertical arrangement above the base assembly.

13. The reflective lighting system of claim 12, wherein the reflector is arranged above a subject space and is configured to direct light from the light source downward into the subject space.

14. The reflective lighting system of claim 9, further comprising:
- a highest point; and
- a light output area where light from the light source is output from the reflective lighting system toward the subject space; and wherein a distance between the light output area and the highest point is less than 3 inches.

15. The reflective lighting system of claim 14, wherein the distance is about 1 inch.

16. The reflective lighting system of claim 14, wherein the light source has a height of greater than 3 inches.

17. A photography station comprising:
- a digital camera arranged to capture a photograph of a subject in a subject space;
- a main lighting system configured to illuminate the subject in the subject space;
- a photographic background positioned behind the subject space and opposite the digital camera;
- a hair lighting system, the hair lighting system comprising:
  - a diffusion panel hidden from the digital camera by the photographic background and configured to receive light from a light source; and
  - a reflector positioned above the photographic background and arranged to receive light from the diffusion panel and redirect the light from the diffusion panel toward the subject space.

18. The photography station of claim 17, wherein the arrangement of the diffusion panel and the reflector defines a distal edge of the light beam, wherein the digital camera is positioned outside of the distal edge of the light beam to prevent the hair lighting system from causing lens flare at the digital camera.

19. The photography station of claim 17, wherein the arrangement of the diffusion panel, the reflector, and the photographic background prevents the hair lighting system from directly illuminating a surface of the photographic background facing the digital camera.

20. The photography station of claim 17, wherein the main lighting system comprises a reflective lighting system.

* * * * *